US009665763B2

(12) United States Patent
Du et al.

(10) Patent No.: US 9,665,763 B2
(45) Date of Patent: May 30, 2017

(54) FINGER/NON-FINGER DETERMINATION FOR BIOMETRIC SENSORS

(71) Applicant: QUALCOMM Incorporated, San Diego, CA (US)

(72) Inventors: Eliza Yingzi Du, Cupertino, CA (US); Ming Yu Chen, Santa Clara, CA (US); Esra Vural, Santa Clara, CA (US); Kwokleung Chan, San Jose, CA (US); Suryaprakash Ganti, Los Altos, CA (US); John Keith Schneider, Williamsville, NY (US); David William Burns, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 50 days.

(21) Appl. No.: 14/474,164

(22) Filed: Aug. 31, 2014

(65) Prior Publication Data

US 2016/0063294 A1    Mar. 3, 2016

(51) Int. Cl.
*G06K 9/00* (2006.01)

(52) U.S. Cl.
CPC ....... *G06K 9/0002* (2013.01); *G06K 9/00013* (2013.01); *G06K 9/00033* (2013.01); *G06K 9/00067* (2013.01)

(58) Field of Classification Search
CPC ............ G06K 9/0002; G06K 9/00013; G06K 9/00033; G06K 9/00067
See application file for complete search history.

(56) References Cited

U.S. PATENT DOCUMENTS

| | | | | |
|---|---|---|---|---|
| 3,822,339 A | * | 7/1974 | Mizuno et al. | B01D 53/501 423/238 |
| 5,530,456 A | | 6/1996 | Kokubo | |
| 5,551,295 A | * | 9/1996 | Stockburger | A61B 5/1172 356/71 |
| 5,659,626 A | * | 8/1997 | Ort | G06K 9/00067 382/125 |
| 5,689,576 A | * | 11/1997 | Schneider | G01S 7/52061 382/124 |
| 5,852,670 A | * | 12/1998 | Setlak | G06K 9/0002 382/126 |

(Continued)

FOREIGN PATENT DOCUMENTS

| EP | 2521069 A2 | 11/2012 |
|---|---|---|
| WO | 2009137105 A2 | 11/2009 |

OTHER PUBLICATIONS

Tang et al. "Ultrasonic fingerprint sensor using a piezoelectric micromachined ultrasonic transducer array integrated with complementary metal oxide semiconductor electronics" Applied Physics Letters 106, 263503 (2015) pages.*

(Continued)

*Primary Examiner* — Mia M Thomas
(74) *Attorney, Agent, or Firm* — Weaver Austin Villeneuve & Sampson LLP

(57) ABSTRACT

Some methods may involve determining whether an object is positioned on or near a portion of a fingerprint sensor system. If an object is positioned on or near the portion of the fingerprint sensor system, an acoustic impedance of at least a portion of the object may be determined. Based at least in part on the acoustic impedance, it may be determined whether the object is a finger.

29 Claims, 22 Drawing Sheets

(56) References Cited

U.S. PATENT DOCUMENTS

| | | | |
|---|---|---|---|
| 6,636,973 B1 | 10/2003 | Novoa et al. | |
| 6,766,040 B1 | 7/2004 | Catalano et al. | |
| 6,914,517 B2* | 7/2005 | Kinsella | G06K 9/00013 340/5.1 |
| 6,922,478 B1* | 7/2005 | Konen | G06K 9/00221 382/115 |
| 7,123,755 B2 | 10/2006 | Shigeta | |
| 7,181,052 B2* | 2/2007 | Fujieda | G06K 9/00899 340/5.83 |
| 7,236,616 B1 | 6/2007 | Scott | |
| 7,366,328 B2* | 4/2008 | Hamid | G06K 9/00046 340/5.52 |
| 7,421,099 B2* | 9/2008 | Schneider | G06K 9/0002 340/5.53 |
| 7,433,484 B2 | 10/2008 | Asseily et al. | |
| 8,165,356 B2 | 4/2012 | Lee et al. | |
| 8,184,872 B2* | 5/2012 | Lu | G06K 9/00006 340/5.53 |
| 8,374,407 B2 | 2/2013 | Benkley et al. | |
| 8,508,340 B2* | 8/2013 | Sanchez Sanchez | G06F 21/32 340/5.53 |
| 8,520,914 B2* | 8/2013 | Niinuma | G06K 9/00093 340/5.83 |
| 8,531,425 B2* | 9/2013 | Westerman | G06F 3/0488 345/156 |
| 8,593,160 B2* | 11/2013 | Thompson | G06K 9/0002 178/18.06 |
| 8,618,910 B2 | 12/2013 | Setlak et al. | |
| 8,710,956 B2* | 4/2014 | Longo | G06K 9/0002 340/5.52 |
| 8,867,799 B2* | 10/2014 | Benkley, III | G06K 9/00053 382/107 |
| 9,071,760 B2 | 6/2015 | Ueda | |
| 9,092,125 B2* | 7/2015 | Michaelis | G06F 3/04845 |
| 9,195,879 B1* | 11/2015 | Du | G06K 9/00013 |
| 9,244,545 B2* | 1/2016 | Hinckley | G06F 3/038 |
| 9,262,003 B2* | 2/2016 | Kitchens | G06F 3/0414 |
| 9,277,334 B1* | 3/2016 | Wong | H04R 25/606 |
| 9,342,674 B2* | 5/2016 | Abdallah | G06F 21/32 |
| 9,547,083 B2* | 1/2017 | Bandyopadhyay | G06K 9/36 |
| 2001/0026632 A1* | 10/2001 | Tamai | G06K 9/00 382/116 |
| 2002/0174346 A1* | 11/2002 | Ting | G06F 21/32 713/186 |
| 2002/0181749 A1 | 12/2002 | Matsumoto et al. | |
| 2004/0019292 A1* | 1/2004 | Drinan | A61B 5/053 600/547 |
| 2004/0252867 A1* | 12/2004 | Lan | G06K 9/0004 382/124 |
| 2005/0100200 A1 | 5/2005 | Abiko et al. | |
| 2005/0101846 A1* | 5/2005 | Fine | A61B 5/0095 600/316 |
| 2005/0105784 A1* | 5/2005 | Nam | G06K 9/0002 382/124 |
| 2005/0163351 A1* | 7/2005 | Kim | G06K 9/0002 382/124 |
| 2005/0249387 A1* | 11/2005 | Machida | G06K 9/00335 382/124 |
| 2006/0083411 A1* | 4/2006 | Benkley, III | G06K 9/00053 382/124 |
| 2006/0181521 A1* | 8/2006 | Perreault | G06F 1/1613 345/173 |
| 2006/0190836 A1* | 8/2006 | Ling Su | G06F 1/1616 715/773 |
| 2006/0224645 A1* | 10/2006 | Kadi | G06F 3/0238 708/200 |
| 2008/0063245 A1* | 3/2008 | Benkley | G06F 3/041 382/124 |
| 2008/0205714 A1* | 8/2008 | Benkley | G06F 3/03547 382/126 |
| 2008/0219521 A1* | 9/2008 | Benkley | G06K 9/00026 382/124 |
| 2008/0226132 A1* | 9/2008 | Gardner | G06K 9/00026 382/107 |
| 2008/0240523 A1* | 10/2008 | Benkley | G06K 9/00026 382/126 |
| 2009/0074255 A1* | 3/2009 | Holm | G06K 9/00885 382/115 |
| 2009/0083847 A1 | 3/2009 | Fadell et al. | |
| 2009/0153297 A1* | 6/2009 | Gardner | G06K 9/00026 340/5.83 |
| 2009/0154779 A1* | 6/2009 | Satyan | G06K 9/036 382/124 |
| 2009/0155456 A1* | 6/2009 | Benkley | G06K 9/00013 427/64 |
| 2009/0274343 A1 | 11/2009 | Clarke | |
| 2010/0119124 A1* | 5/2010 | Satyan | G06K 9/00026 382/124 |
| 2010/0215224 A1 | 8/2010 | Saito | |
| 2010/0278008 A1* | 11/2010 | Ammar | G01S 7/521 367/7 |
| 2011/0002461 A1* | 1/2011 | Erhart | H04L 9/302 380/44 |
| 2011/0037563 A1* | 2/2011 | Choi | G06F 21/32 340/5.83 |
| 2011/0279662 A1* | 11/2011 | Schneider | A61B 5/1172 348/61 |
| 2012/0147698 A1* | 6/2012 | Wong | B60B 1/02 367/7 |
| 2012/0177257 A1* | 7/2012 | Maev | G06K 9/0002 382/124 |
| 2012/0279865 A1* | 11/2012 | Regniere | C25D 5/48 205/125 |
| 2012/0299856 A1* | 11/2012 | Hasui | G06F 3/0418 345/173 |
| 2012/0326735 A1* | 12/2012 | Bennett | B62D 1/06 324/705 |
| 2013/0023767 A1* | 1/2013 | Mammone | A61B 8/0825 600/440 |
| 2013/0038339 A1 | 2/2013 | Peterson et al. | |
| 2013/0120252 A1* | 5/2013 | Lam | G06F 3/033 345/157 |
| 2013/0133428 A1* | 5/2013 | Lee | G06K 9/0012 73/589 |
| 2013/0136321 A1* | 5/2013 | Lee | G06K 9/0012 382/124 |
| 2013/0200907 A1* | 8/2013 | Schneider | G06K 9/0002 324/686 |
| 2013/0201153 A1* | 8/2013 | Schneider | G06F 3/044 345/174 |
| 2013/0279770 A1 | 10/2013 | Abe | |
| 2014/0079300 A1 | 3/2014 | Wolfer et al. | |
| 2014/0143064 A1* | 5/2014 | Tran | A61B 5/0022 705/14.66 |
| 2014/0181710 A1* | 6/2014 | Baalu | G06F 3/005 715/765 |
| 2014/0226879 A1 | 8/2014 | Westerman et al. | |
| 2014/0267065 A1* | 9/2014 | Levesque | G06F 3/016 345/173 |
| 2014/0354596 A1* | 12/2014 | Djordjev | G06K 9/0002 345/175 |
| 2014/0355381 A1* | 12/2014 | Lal | B81B 3/0021 367/87 |
| 2014/0359757 A1* | 12/2014 | Sezan | G06F 21/32 726/19 |
| 2015/0081552 A1* | 3/2015 | Stewart | G06Q 20/40145 705/44 |
| 2015/0189136 A1* | 7/2015 | Chung | G06K 9/00013 348/77 |
| 2015/0199552 A1* | 7/2015 | Du | G06F 21/32 382/124 |
| 2015/0241393 A1* | 8/2015 | Ganti | G01N 29/09 73/589 |
| 2015/0253935 A1* | 9/2015 | Toda | G06F 3/0414 345/174 |
| 2015/0297181 A1* | 10/2015 | Akramov | A61B 8/4483 600/459 |

(56) References Cited

U.S. PATENT DOCUMENTS

| | | |
|---|---|---|
| 2016/0063296 A1 | 3/2016 | Du et al. |
| 2016/0063300 A1* | 3/2016 | Du ................. G06K 9/00033 |
| | | 382/124 |
| 2016/0171198 A1* | 6/2016 | John Archibald ...... G06F 21/32 |
| | | 726/19 |

OTHER PUBLICATIONS

Alvarez-Arenas et al. "Acoustic Impedance Matching of Piezoelectric Transducers to the Air" ieee transactions on ultrasonics, ferroelectrics, and frequency control, vol. 51, No. 5, May 2004 (pp. 1-10).*

Schmitt et al. "Ultrasonic Imaging of Fingerprints using Acoustical Impediography" 2004 IEEE International Ultrasonics, Ferroelectrics, and Frequency Control Joint 50th Anniversary Conference pp. 1-9.*

U.S. Notice of Allowance dated Sep. 25, 2015, issued in U.S. Appl. No. 14/474,163.

International Search Report and Written Opinion—PCT/US2015/042094—ISA/EPO—Oct. 23, 2015.

International Search Report and Written Opinion—PCT/US2015/042091—ISA/EPO—Oct. 14, 2015.

International Search Report and Written Opinion—PCT/US2015/042101—ISA/EPO—Oct. 30, 2015.

Guan H., et al., "Real-time feedback for usable fingerprint systems", Biometrics (IJCB), 2011 International Joint Conference on, IEEE, Oct. 11, 2011 (Oct. 11, 2011), pp. 1-8, XP032081561, DOI: 10.1109/IJCB.2011.6117495 ISBN: 978-1-4577-1358-3 sections 3-3.5; figures 1-9.

Schmitt R M., et al., "Model based development of a commercial, acoustic fingerprint sensor", Ultrasonics Symposium (IUS), 2012 IEEE International, IEEE, Oct. 7, 2012 (Oct. 7, 2012) pp. 1075-1085, XP032434629, ISSN: 1948-5719, DOI: 10.1109/ULTSYM.2012.0269 ISBN: 978-1-4673-4561-3 abstract sections I-IV, VI, VII figures 1-6,; table I.

Schmitt R.M., et al., "Acoustic Impediography: Imaging Surface Acoustic Impedance Using 1-3 Piezo-Composite for Integrated Fingerprinting", Electronic Components and Technology Conference (ECTC), 2011 IEEE 61st, IEEE, May 31, 2011 (May 31, 2011), pp. 1296-1299, XP031996703, DOI: 10.1109/ECTC.2011.5898678 ISBN: 978-1-61284-497-8 p. 1296. right-hand column, line 15—p. 1299, left-hand column, line 11; figures 4-7.

Topcu B., et al., "Fingerprint Matching Utilizing Non-distal Phalanges," pattern recognition (!CPR), 2012 21st International Conference on, IEEE, Nov. 11, 2012 (Nov. 11, 2012), pp. 2400-2403, XP032329835, ISBN: 978-1-4673-2216-4.

Orczyk T., et al., "Fingerprint Ridges Frequency", IEEE, Third World Congress on Nature and Biologically Inspired Computing (NaBIC),Oct. 2011, pp. 558-561.

U.S. Office Action dated Jun. 29, 2016, issued in U.S. Appl. No. 14/474,160.

U.S. Notice of Allowance dated Dec. 27, 2016, issued in U.S. Appl. No. 14/474,160.

U.S. Notice of Allowance dated Oct. 31, 2016, issued in U.S. Appl. No. 14/474,160.

International Preliminary Report on Patentability—PCT/US2015/042091—ISA/EPO—Nov. 23, 2016.

* cited by examiner

|        | # Blocks | Std < 3 Air | Std > 3 Object |
|--------|----------|-----|--------|
| Air    | 40       | 100% |        |
| Finger | 80       |      | 100%   |

Acoustic Impedance

| Substance | C (m/s) | Z (MRayls) |
|---|---|---|
| Adipose Tissue | 1450 | 1.38 |
| Air (25C) | 346 | 0.00041 |
| Aluminum | 6320 | 17 |
| Blood (37C) | 1570 | 1.67 |
| Bone | 4000 | 3.8-7.8 |
| Connective Tissue | 1613 | 1.81 |
| Fat | 1450 | 1.34-1.41 |
| Lymph Fluid / Blood Plasma | 1543 | 1.58 |
| Muscle | 1547 | 1.62 |
| Patella | 3000 | 5.4 |
| Skin | 1615 | 1.76 |
| Skin - Epidermis | 1729 | 1.9-2.1 |
| Soft Tissue | 1540 | 1.63 |
| Water (25C) | 1493 | 1.48 |

*Figure 6B*

FINGER/NON-FINGER DETERMINATION FOR BIOMETRIC SENSORS

TECHNICAL FIELD

This disclosure relates generally to authentication devices and methods, particularly authentication devices and methods applicable to mobile devices.

DESCRIPTION OF THE RELATED TECHNOLOGY

As mobile devices become more versatile, user authentication becomes increasingly important. Increasing amounts of personal information may be stored on and/or accessible by a mobile device. Moreover, mobile devices are increasingly being used to make purchases and perform other commercial transactions. Existing authentication methods typically involve the use of a password or passcode, which may be forgotten by a rightful user or used by an unauthorized person. Improved authentication methods are desirable.

SUMMARY

The systems, methods and devices of the disclosure each have several innovative aspects, no single one of which is solely responsible for the desirable attributes disclosed herein.

One innovative aspect of the subject matter described in this disclosure can be implemented in an apparatus, such as a fingerprint sensing apparatus. The fingerprint sensing apparatus may include a fingerprint sensor system and a control system. The control system may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof. The control system may be capable of receiving fingerprint sensor data from the fingerprint sensor system and of determining, according to the fingerprint sensor data, whether an object is positioned proximate a portion of the fingerprint sensor system.

According to some implementations, if the control system determines that an object is positioned proximate the portion of the fingerprint sensor system, the control system may determine whether the object is a finger or a non-finger object. As used herein, the term "finger" may refer to any digit, including a finger or a thumb. Accordingly, as used herein the term "fingerprint" may refer to a fingerprint or a thumbprint.

In some implementations, if the control system determines that the object is a finger, the control system may determine whether the fingerprint sensor data includes fingerprint image information of at least an image quality threshold. In some examples, the control system may extract fingerprint features from the fingerprint image information if fingerprint image information of at least the image quality threshold is included in the fingerprint sensor data. Extracted fingerprint features may, for example, include fingerprint ridge endings, fingerprint ridge bifurcations, short ridges and/or islands.

In some implementations, the control system may be capable of determining an extracted fingerprint feature quality. The control system may be capable of generating a fingerprint template based, at least in part, on extracted fingerprint features. In some examples, the control system may determine whether to generate a fingerprint template based, at least in part, on the extracted fingerprint feature quality, e.g., according to an extracted fingerprint feature quality score.

According to some implementations, the control system may be capable of determining a fingerprint template quality. Determining the fingerprint template quality may, for example, involve determining a fingerprint template quality score. The fingerprint template quality score may, for example, be based on a template matching score, a minutia quality, a minutiae quantity, a feature quality, a feature quantity, image contrast, image gradient information, a ridge orientation quality, a ridge frequency and/or a ridge flow quality.

In some examples, the control system may be capable of comparing the fingerprint template with a previously-obtained fingerprint template and of determining whether the fingerprint template matches the previously-obtained fingerprint template. In some examples, the control system may determine whether to compare the fingerprint template with a previously-obtained fingerprint template based, at least in part, on the fingerprint template quality of the fingerprint template.

In some implementations, the control system may be capable of updating the previously-obtained fingerprint template to include at least one of the extracted fingerprint features if the control system determines that the fingerprint template matches the previously-obtained fingerprint template. In some such implementations, the control system may determine whether to update the previously-obtained fingerprint template based, at least in part, on the fingerprint template quality of the fingerprint template.

According to some implementations, determining whether an object is a finger may involve determining whether the fingerprint sensor data indicates elements that are within a range of spatial frequencies. The elements may, for example, be periodic or quasi-periodic elements. In some examples, determining whether the object is a finger may involve distinguishing a finger from another body part. In some implementations, determining whether the object is a finger may involve transforming fingerprint sensor data into the frequency domain, performing a texture analysis, applying a feature detection algorithm and/or applying an edge detection algorithm.

In some examples, determining whether the object is a finger may involve determining that a non-finger object is a stylus. According to some such implementations, the control system may be capable of providing a stylus output signal indicating whether the non-finger object is a stylus.

In some implementations, the fingerprint sensor system may include an ultrasonic sensor array. According to some such implementations, the control system may be capable of assessing an acoustic impedance of one or more objects proximate the fingerprint sensor system. For example, the control system may be capable of determining whether an object has an acoustic impedance that is within an acoustic impedance range corresponding to that of skin. According to some such implementations, the acoustic impedance range may be from 1.3 MRayls to 2.1 MRayls. If the control system determines that the object has an acoustic impedance that is within a range corresponding to that of skin, in some implementations the control system may invoke a process for distinguishing a finger from another body part.

Other innovative aspects of the subject matter described in this disclosure can be implemented in a fingerprint sensing method that may involve receiving fingerprint sensor data from a fingerprint sensor system and determining, according to the fingerprint sensor data, whether an object is positioned proximate a portion of the fingerprint sensor system. The method may involve determining, if it is determined that an object is positioned proximate the portion of the fingerprint sensor system, whether the object is a finger or a non-finger object.

If it is determined that the object is a finger, the method may involve determining whether the fingerprint sensor data includes fingerprint image information of at least an image quality threshold. The method may involve extracting fingerprint features from the fingerprint image information if it is determined that fingerprint image information of at least the image quality threshold is included in the fingerprint sensor data.

Some or all of the methods described herein may be performed by one or more devices according to instructions (e.g., software) stored on non-transitory media. Such non-transitory media may include memory devices such as those described herein, including but not limited to random access memory (RAM) devices, read-only memory (ROM) devices, etc. Accordingly, some innovative aspects of the subject matter described in this disclosure can be implemented in a non-transitory medium having software stored thereon.

For example, the software may include instructions for controlling a fingerprint sensing apparatus to receive fingerprint sensor data from a fingerprint sensor system and to determine, according to the fingerprint sensor data, whether an object is positioned proximate a portion of the fingerprint sensor system. In some examples, the software may include instructions for controlling a fingerprint sensing apparatus to determine, if the fingerprint sensing apparatus determines that an object is positioned proximate the portion of the fingerprint sensor system, whether the object is a finger or a non-finger object.

In some implementations, the software may include instructions for controlling the fingerprint sensing apparatus to determine whether the fingerprint sensor data includes fingerprint image information of at least an image quality threshold. In some examples, the software may include instructions for controlling the fingerprint sensing apparatus to extract fingerprint features from the fingerprint image information if fingerprint image information of at least the image quality threshold is included in the fingerprint sensor data.

Other innovative aspects of the subject matter described in this disclosure can be implemented in a fingerprint sensing apparatus. The fingerprint sensing apparatus may include a fingerprint sensor system and a control system. In some examples, the control system may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof.

The control system may be capable of receiving fingerprint sensor data from the fingerprint sensor system, of determining fingerprint sensor data blocks for at least a portion of the fingerprint sensor data, of calculating statistical variance values for fingerprint sensor data corresponding to each of the fingerprint sensor data blocks, and of determining, according to the statistical variance values, whether an object is positioned proximate a portion of the fingerprint sensor system.

According to some implementations, determining whether an object is positioned proximate a portion of the fingerprint sensor system may involve determining whether the statistical variance values are above or below a threshold value. In some examples, the statistical variance values may be based, at least in part, on a fingerprint sensor signal value or a fingerprint sensor signal gradient.

In some implementations, the control system may be capable of providing an object output signal indicating whether an object is positioned proximate a portion of the fingerprint sensor system. In some such implementations, the control system may be capable of determining whether an object that is positioned proximate the portion of the fingerprint sensor system is a stylus.

According to some implementations, the fingerprint sensor data blocks may correspond to blocks of fingerprint sensor pixels of the fingerprint sensor system. The blocks of fingerprint sensor pixels may or may not be contiguous, depending on the particular implementation. In some examples, the blocks of fingerprint sensor pixels may include substantially all fingerprint sensor pixels of the fingerprint sensor system. In some implementations, the blocks of fingerprint sensor pixels may have at least two different sizes.

In some implementations, the control system may be capable of applying one or more filters to the fingerprint sensor data before calculating the statistical variance values. For example, the one or more filters may pass a range of spatial frequencies corresponding to fingerprint features.

Accordingly, in some implementations the control system may be capable of determining whether an object is a finger. In some examples, the control system may extract fingerprint features from the fingerprint sensor data if the control system determines that the object is a finger.

According to some implementations, the fingerprint sensor system may include an ultrasonic sensor array. In some such implementations, the control system may be capable of assessing an acoustic impedance of one or more objects proximate the fingerprint sensor system. For example, the control system may be capable of determining whether an object has an acoustic impedance that is within an acoustic impedance range corresponding to that of skin. In some implementations, the acoustic impedance range may be from 1.3 MRayls to 2.1 MRayls. However, in alternative implementations, the acoustic impedance range may be a different range, such as a narrower range or a broader range. In some implementations, the control system may be capable of determining whether a skin-covered object is a finger or another body part.

Other innovative aspects of the subject matter described in this disclosure can be implemented in a fingerprint sensing method. The method may involve receiving fingerprint sensor data from a fingerprint sensor system, determining fingerprint sensor data blocks for at least a portion of the fingerprint sensor data, calculating statistical variance values for fingerprint sensor data corresponding to each of the fingerprint sensor data blocks and determining, according to the statistical variance values, whether an object is positioned proximate a portion of the fingerprint sensor system.

For example, the fingerprint sensor data blocks may correspond to blocks of fingerprint sensor pixels. In some implementations, the method may involve determining whether an object is a finger. The method may involve assessing an acoustic impedance of one or more objects proximate the fingerprint sensor system.

Some innovative aspects of the subject matter described in this disclosure can be implemented in a non-transitory medium having software stored thereon. For example, the software may include instructions for controlling a fingerprint sensing apparatus to receive fingerprint sensor data from a fingerprint sensor system, determine fingerprint sensor data blocks for at least a portion of the fingerprint sensor data, calculate statistical variance values for fingerprint sensor data corresponding to each of the fingerprint sensor data blocks and determine, according to the statistical variance values, whether an object is positioned proximate a portion of the fingerprint sensor system.

For example, the fingerprint sensor data blocks may correspond to blocks of fingerprint sensor pixels. In some implementations, the software may include instructions for controlling the fingerprint sensing apparatus to determine whether an object is a finger. In some instances, the software may include instructions for controlling the fingerprint sensing apparatus to assess an acoustic impedance of one or more objects proximate the fingerprint sensor system.

Other innovative aspects of the subject matter described in this disclosure can be implemented in a fingerprint sensing apparatus. The fingerprint sensing apparatus may include a fingerprint sensor system and a control system. The fingerprint sensor system may include an ultrasonic sensor array.

In some examples, the control system may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof. The control system may be capable of receiving fingerprint sensor data from the fingerprint sensor system, of determining that an object is positioned proximate a portion of the fingerprint sensor system and of determining an acoustic impedance of at least a portion of the object.

The control system may be capable of determining whether the acoustic impedance is within an acoustic impedance range corresponding to that of skin and of determining, based at least in part on the acoustic impedance, whether the object is a finger. The acoustic impedance range may, for example, be between about 1.3 MRayls and 2.1 MRayls.

In some examples, the control system may be capable of determining whether the object is a stylus. In some such implementations, the control system may be capable of providing a stylus output signal indicating whether the object is a stylus.

In some implementations, the control system may be capable of distinguishing a finger from another body part. For example, distinguishing a finger from another body part involves distinguishing a nose, a cheek, a palm, an elbow, a knuckle or another part of the body from a finger. The control system may be capable of extracting fingerprint features from the fingerprint sensor data if the control system determines that the object is a finger.

According to some implementations, determining whether the object is a finger may involve detecting patterns associated with fingerprints. Detecting patterns associated with fingerprints may involve a local texture pattern analysis, a gradient-based pattern analysis, a wavelet-based analysis, a frequency domain analysis, or combinations thereof.

In some implementations, the control system may be capable of applying one or more filters to the fingerprint sensor data before detecting patterns associated with fingerprints. The one or more filters may, for example, pass a range of spatial frequencies corresponding to patterns associated with fingerprints. The one or more filters may include a band-pass filter, low-pass filter, a median filter, a de-noise filter, a Gaussian filter, a wavelet filter and/or a running-average filter.

According to some implementations, detecting patterns associated with fingerprints may involve evaluating fingerprint sensor data blocks for at least a portion of the fingerprint sensor data. The fingerprint sensor data blocks may correspond to blocks of fingerprint sensor pixels of the fingerprint sensor system. The blocks of fingerprint sensor pixels may or may not be contiguous, depending on the particular implementation. In some examples, the blocks may include substantially all fingerprint sensor pixels that correspond with the object.

In some implementations, determining whether the object is a finger may involve detecting a finger shape. Detecting a finger shape may, for example, involve detecting a three-dimensional shape.

Other innovative aspects of the subject matter described in this disclosure can be implemented in a method of determining whether an object is a finger. The method may involve receiving fingerprint sensor data from a fingerprint sensor system, determining that an object is positioned proximate a portion of the fingerprint sensor system and determining an acoustic impedance of at least a portion of the object. The method may involve determining whether the acoustic impedance is within an acoustic impedance range corresponding to that of skin.

The method may involve determining, based at least in part on the acoustic impedance, whether the object is a finger. However, in some implementations, determining whether the object is a finger may involve detecting patterns associated with fingerprints.

Some innovative aspects of the subject matter described in this disclosure can be implemented in a non-transitory medium having software stored thereon. For example, the software may include instructions for controlling a fingerprint sensing apparatus to receive fingerprint sensor data from a fingerprint sensor system, to determine that an object is positioned proximate a portion of the fingerprint sensor system and to determine an acoustic impedance of at least a portion of the object. The software may include instructions for controlling the fingerprint sensing apparatus to determine whether the acoustic impedance is within an acoustic impedance range corresponding to that of skin and to determine, based at least in part on the acoustic impedance, whether the object is a finger.

However, in some implementations, determining whether the object is a finger may involve detecting patterns associated with fingerprints. Detecting patterns associated with fingerprints may, for example, involve a local texture pattern analysis, a gradient-based pattern analysis, a wavelet-based analysis, a frequency domain analysis, or combinations thereof. In some examples, detecting patterns associated with fingerprints may involve evaluating fingerprint sensor data blocks for at least a portion of the fingerprint sensor data. The fingerprint sensor data blocks may correspond to blocks of fingerprint sensor pixels of the fingerprint sensor system. According to some implementations, the software may include instructions for controlling the fingerprint sensing apparatus to distinguish a finger from another body part.

BRIEF DESCRIPTION OF THE DRAWINGS

Details of one or more implementations of the subject matter described in this specification are set forth in the accompanying drawings and the description below. Other features, aspects, and advantages will become apparent from FIG. 1A is a block diagram that shows example components of a fingerprint sensing apparatus.

FIG. 6B is a table that provides examples of acoustic impedance values for some common substances.

DETAILED DESCRIPTION

Figure 1A:
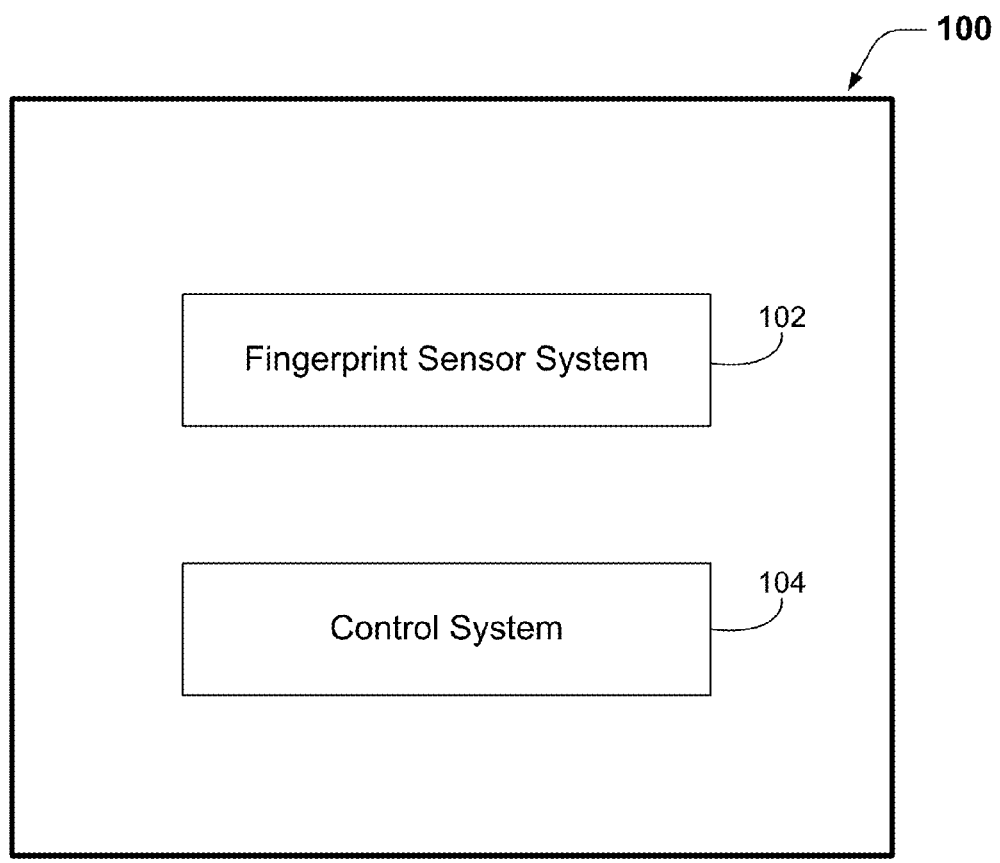
FIG. 1B is a flow diagram that provides examples of fingerprint sensing apparatus operations.
FIG. 1C is a flow diagram that provides additional examples of fingerprint sensing apparatus operations.
FIG. 1D is a flow diagram that provides additional examples of fingerprint sensing apparatus operations.
FIG. 1E is a flow diagram that provides additional examples of fingerprint sensing apparatus operations.
FIG. 1F is a flow diagram that provides additional examples of fingerprint sensing apparatus operations.

The following description is directed to certain implementations for the purposes of describing the innovative aspects of this disclosure. However, a person having ordinary skill in the art will readily recognize that the teachings herein may be applied in a multitude of different ways. The described implementations may be implemented in any device, apparatus, or system that includes a touch/fingerprint sensing system. In addition, it is contemplated that the described implementations may be included in or associated with a variety of electronic devices such as, but not limited to: mobile telephones, multimedia Internet enabled cellular telephones, mobile television receivers, wireless devices, smartphones, Bluetooth® devices, personal data assistants (PDAs), wireless electronic mail receivers, hand-held or portable computers, netbooks, notebooks, smartbooks, tablets, printers, copiers, scanners, facsimile devices, global positioning system (GPS) receivers/navigators, cameras, digital media players (such as MP3 players), camcorders, game consoles, wrist watches, clocks, calculators, television monitors, flat panel displays, electronic reading devices (e.g., e-readers), mobile health devices, computer monitors, auto displays (including odometer and speedometer displays, etc.), cockpit controls and/or displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, packaging (such as in electromechanical systems (EMS) applications including microelectromechanical systems (MEMS) applications, as well as non-EMS applications), aesthetic structures (such as display of images on a piece of jewelry or clothing) and a variety of EMS devices. The teachings herein also may be used in applications such as, but not limited to, electronic switching devices, radio frequency filters, sensors, accelerometers, gyroscopes, motion-sensing devices, magnetometers, inertial components for consumer electronics, parts of consumer electronics products, varactors, liquid crystal devices, electrophoretic devices, drive schemes, manufacturing processes and electronic test equipment. Thus, the teachings are not intended to be limited to the implementations depicted solely in the Figures, but instead have wide applicability as will be readily apparent to one having ordinary skill in the art.

Fingerprint sensors for mobile devices can require extensive computing time and resources. For example, a frame of fingerprint sensor data may be acquired in about 50 milliseconds (@20 frames per second). However, it may take about 450 milliseconds to process the fingerprint sensor data fully. Consumers desire fast access times. Moreover, consumers may not consistently or properly position a digit on a fingerprint scanner. Fingerprint scanning and authentication processes may be started unintentionally, wasting computing resources and energy. Current systems generate fingerprint templates for all fingerprint sensor data, whether or not the data includes useable fingerprint information. Current systems take the full processing time to process each fingerprint sensor data frame, regardless of data quality. Fingerprint template information, which may include pertinent information about one or more fingerprint features or minutiae, may be stored as a "fingerprint template" in a mobile device. The fingerprint template may be used for enrollment, matching, verification, authentication, and/or other purposes by the mobile device.

Various implementations disclosed herein may involve "layered" filtering and/or signal processing for biometric sensors. In some examples, complete processing of fingerprint sensor data may only take place if each "layer" or stage concludes successfully. (As noted elsewhere herein, the term "finger" may refer to any digit, including a finger or a thumb, and the term "fingerprint" may refer to a fingerprint or a thumbprint.) However, in some implementations at least some processes of different layers may be performed in parallel. If any layer concludes unsuccessfully, the process may terminate and additional new fingerprint sensor data may be obtained.

In some implementations, an initial screening layer may involve determining whether there is an object on or near a fingerprint sensor. This initial or first layer may provide an object/non-object output signal indicating whether an object is on or near the fingerprint sensor. The initial or first layer may provide an air/non-air output signal indicating whether a material like air or another material is on or near the fingerprint sensor. A second layer may involve determining whether the object is a finger (or at least whether the object is finger-like). The second layer may involve a determination of whether the object includes typical fingerprint patterns (e.g., ridges and valleys). Alternatively, or additionally, the second layer may involve determining whether an object has an acoustic impedance that is within an acoustic impedance range corresponding to that of skin. In some examples, determining whether the object is a finger may involve distinguishing a finger from another body part. Determining whether the object is a finger may involve determining that a non-finger object is a stylus. The second layer may provide a finger/non-finger output signal indicating whether a finger is on the fingerprint sensor. The second layer may provide an acoustic impedance output signal indicating whether the acoustic impedance of an object on the fingerprint sensor is within a predetermined range. The second layer may provide a low-level fraud output signal indicating whether an object on the fingerprint sensor may be a fraud. The second layer may provide a stylus/non-stylus output signal indicating whether a tip of a stylus is on the sensor.

A third layer may involve measuring the quality of a fingerprint image and, in some instances, invoking a routine to improve the quality of the image. The third layer may provide an image quality output signal indicating an image quality score. The third layer may provide an image quality output signal indicating whether an image quality is above a threshold. A fourth layer may involve quality scoring of fingerprint features and/or templates, and may involve providing an indication of fingerprint matching confidence. The fourth layer may provide and/or store a feature quality output signal indicating a level of quality for a feature. The fourth layer may provide and/or store a template quality output signal indicating a level of quality of a template. The fourth layer may provide a recognition confidence level output signal indicating a level of confidence that a template could be matched, or whether the recognition confidence level is above a predetermined threshold. One or more of these output signals may be stored, sent to or otherwise provided to various software applications running on a mobile device. For example, the outputs may be provided to one or more application processors, described in more detail with respect to FIGS. 9A and 9B.

However, some implementations may include more or fewer layers. Moreover, some implementations disclosed herein may or may not be used in connection with a "layered" approach, depending on the particular implementation. For example, some implementations disclosed herein may involve an object/non-object determination that may or may not be implemented as an initial layer of a multi-layered process, according to the particular implementation. Some such implementations may involve a block-based object/non-object determination. For example, some such implementations may involve determining fingerprint sensor data blocks and calculating statistical variance values for fingerprint sensor data corresponding to each of the fingerprint sensor data blocks. The fingerprint sensor data blocks may correspond to blocks of fingerprint sensor pixels.

Similarly, some implementations disclosed herein may involve a finger/non-finger determination that may or may not be implemented as a second layer of a multi-layered process, according to the particular implementation. Some such implementations may involve receiving fingerprint sensor data from a fingerprint sensor system that includes an ultrasonic sensor array. Such implementations may involve determining an acoustic impedance or a representation of the acoustic impedance of at least a portion of an object that is positioned proximate the fingerprint sensor system and determining, based at least in part on the acoustic impedance, whether the object is a finger. For example, such implementations may involve determining whether the acoustic impedance is within an acoustic impedance range corresponding to that of skin. It may be noted that a value of acoustic impedance may be in non-standard units such as millivolts or a binary number between, for example, 0 and 255 (8 bits), which may serve as a representation of the acoustic impedance in standard units such as MRayls ($1E^6$ $kg/m^2/sec$) for means of comparison or determining whether an acoustic impedance is within a predetermined range.

Particular implementations of the subject matter described in this disclosure can be implemented to realize one or more of the following potential advantages. In some implementations, complete processing of fingerprint sensor data may only take place if each "layer" or stage concludes successfully. Therefore, power and computing resources may not be wasted by processing fingerprint sensor data that does not include fingerprint information of sufficiently high quality. Accordingly, some implementations disclosed herein may be capable of providing short access times and high accuracy, while minimizing computing time and resources.

FIG. 1A is a block diagram that shows example components of a fingerprint sensing apparatus. In this example, the fingerprint sensing apparatus 100 includes a fingerprint sensor system 102 and a control system 104. The fingerprint sensor system 102 may include one or more arrays of fingerprint sensor pixels. The fingerprint sensor system 102 may include one or more types of fingerprint sensors, such as optical sensors, capacitive sensors, etc. The fingerprint sensors may be line or swipe sensors, where a user slides a finger over a surface of a sensor, or area sensors, where a user places a finger on or near a surface of a sensor to acquire fingerprint sensor data. In some examples, the fingerprint sensor system 102 may include at least one array of ultrasonic sensors.

The control system 104 may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof. The control system 104 also may include (and/or be configured for communication with) one or more memory devices, such as one or more random access memory (RAM) devices, read-only memory (ROM) devices, etc. The control system 104 may be capable of receiving and processing fingerprint sensor data from the fingerprint sensor system.

Figure 1B:
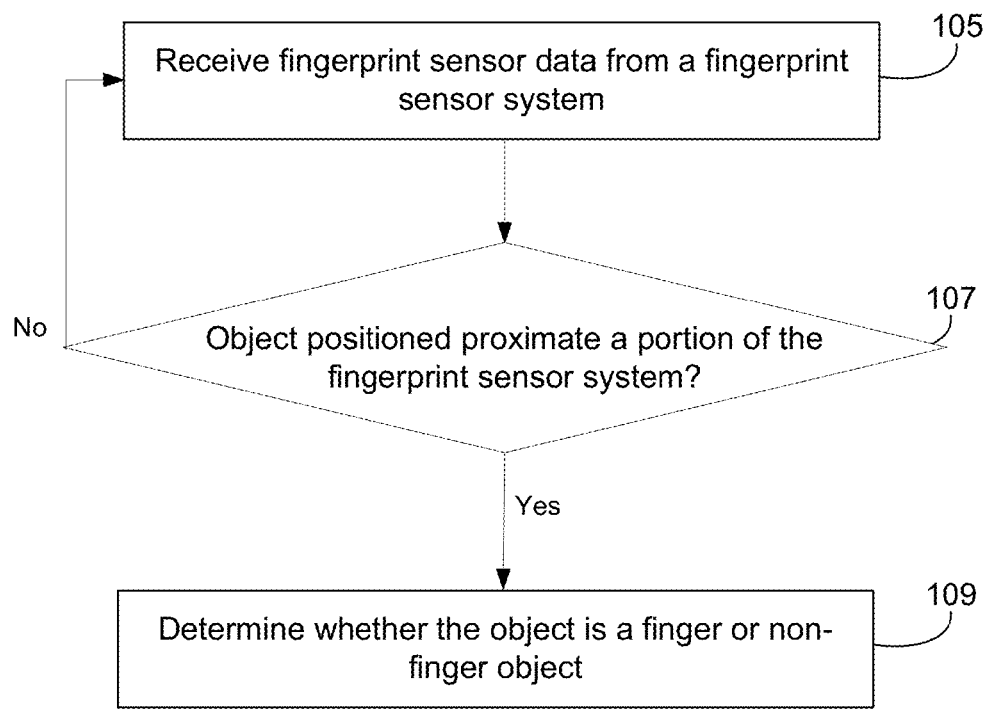

FIG. 1B is a flow diagram that provides examples of fingerprint sensing apparatus operations. The blocks of FIG. 1B (and those of other flow diagrams provided herein) may, for example, be performed by the control system 104 of FIG. 1A or by a similar apparatus. As with other methods disclosed herein, the method outlined in FIG. 1B may include more or fewer blocks than indicated. Moreover, the blocks of methods disclosed herein are not necessarily performed in the order indicated.

Here, block 105 involves receiving fingerprint sensor data from a fingerprint sensor system. The term "fingerprint sensor data" used here and elsewhere references data from the fingerprint sensor. However, the "fingerprint sensor data" from the fingerprint sensor will not necessarily correspond with a fingerprint. For example, in some instances the fingerprint sensor data may indicate the presence of an object and/or of air. The fingerprint sensor system may, for example, be the fingerprint sensor system 102 or a similar apparatus. Accordingly, the blocks of FIG. 1B (and those of other flow diagrams provided herein) may be described with reference to implementations of the control system 104 and/or the fingerprint sensor system 102 disclosed herein.

In this example, block 107 involves determining, based at least in part on the fingerprint sensor data, whether an object is positioned proximate a portion of the fingerprint sensor system. Various examples of object detection are disclosed herein, including implementations for determining whether air or an object is proximate a portion of the fingerprint sensor system. In some implementations, the process may revert to block 105 if it is determined that no object is positioned proximate at least a portion of the fingerprint sensor system.

Some implementations, e.g., implementations wherein block 105 involves receiving "raw" fingerprint sensor data from a fingerprint sensor system, may involve pre-processing the fingerprint sensor data. For example, some implementations may include one or more pre-processing blocks between block 105 and block 107. Such pre-processing may, for example, involve or include gain compensation, offset adjustments, background subtraction, de-noise operations, contrast enhancement, scaling, linearization, clipping, dead or low-performing pixel identification and exclusion, and/or other processes.

If it is determined in block 107 that an object is positioned proximate at least a portion of the fingerprint sensor system, the process continues to block 109 in this example. In this implementation, block 109 involves determining whether the object is a finger. For example, the control system 104 may be capable of determining whether the object is a finger or a non-finger object. As noted elsewhere in this disclosure, the term "fingerprint sensor data" means data from the fingerprint sensor. Therefore, the "fingerprint sensor data" will not necessarily correspond with a fingerprint. In some instances the fingerprint sensor data may indicate the presence of an object and/or of air. Even in cases where the object is a non-finger object, the term "fingerprint sensor data" is used to describe the data (from the non-finger object) that was received from the fingerprint sensor system. In some implementations, the control system 104 may be capable of providing a finger/non-finger output signal indicating whether a finger is positioned proximate a portion of the fingerprint sensor system. Various examples are described below.

In some implementations wherein the fingerprint sensor system 102 includes an ultrasonic sensor array, the control system may be capable of assessing the acoustic impedance of one or more objects proximate the fingerprint sensor system. Determining whether an object is a finger may involve determining whether an object has an acoustic impedance that is within an acoustic impedance range corresponding to that of skin (e.g., between 1.3 MRayls and 2.1 MRayls). As noted elsewhere herein, a value of acoustic impedance may be in non-standard units such as millivolts or a binary number between, for example, 0 and 255 (8 bits), which may serve as a representation of the acoustic impedance in standard units such as MRayls for determining whether an acoustic impedance is within a predetermined range. In some implementations, the control system 104 may be capable of providing an acoustic impedance output signal indicating whether the acoustic impedance of an object on or near a portion of the fingerprint sensor is within a predetermined range, such as a range including skin or other body parts.

In some examples, determining whether the object is a finger may involve determining whether the fingerprint sensor data indicates periodic or quasi-periodic elements that are within a range of spatial frequencies. The range of spatial frequencies may correspond with fingerprint features. The range of spatial frequencies may, in some examples, be expressed in fingerprint line pairs per unit of distance, such as line pairs per millimeter. A fingerprint line pair may, for example, be a pair of fingerprint ridges or valleys. In some implementations, a range of spatial frequencies that corresponds with fingerprint features may be 4-6 fingerprint line pairs per millimeter, or approximately 4-6 fingerprint line pairs per millimeter (e.g., 4.5-6 fingerprint line pairs per millimeter, 4.5-5.5 fingerprint line pairs per millimeter, 4.0-5.5 fingerprint line pairs per millimeter, etc.). In some implementations, a range of spatial frequencies that corresponds with fingerprint features may be 3-7 fingerprint line pairs per millimeter, or approximately 3-7 fingerprint line pairs per millimeter (e.g., 3.5-7 fingerprint line pairs per millimeter, 3.5-6.5 fingerprint line pairs per millimeter, 3.0-6.5 fingerprint line pairs per millimeter, etc.). In some implementations, a range of spatial frequencies that corresponds with fingerprint features may be 2-8 fingerprint line pairs per millimeter, or approximately 2-8 fingerprint line pairs per millimeter (e.g., 2.5-8 fingerprint line pairs per millimeter, 2.5-7.5 fingerprint line pairs per millimeter, 2.0-7.5 fingerprint line pairs per millimeter, etc.). In some implementations, the range of spatial frequencies may be set according to an age and/or finger size of an authorized user.

According to some implementations, determining whether an object is a finger may involve distinguishing a finger from another body part. For example, in some implementations the control system 104 may be capable of distinguishing a finger from another body part, such as a nose, a cheek, a palm, an elbow, or a knuckle. In some implementations, for example, if the control system 104 determines that an object has an acoustic impedance that is within an acoustic impedance range corresponding to that of skin, the control system may invoke further operations to distinguish a finger from another body part and/or to distinguish a finger from a non-finger object that has an acoustic impedance that is within an acoustic impedance range corresponding to that of skin. Such operations may involve transforming fingerprint sensor data into the frequency domain, performing a texture analysis, applying a feature detection algorithm and/or applying an edge detection algorithm. However, in alternative implementations, such operations may be invoked even if the fingerprint sensor system 102 does not include an ultrasonic sensor array and/or even if an object's acoustic impedance has not been determined.

Figure 1C:
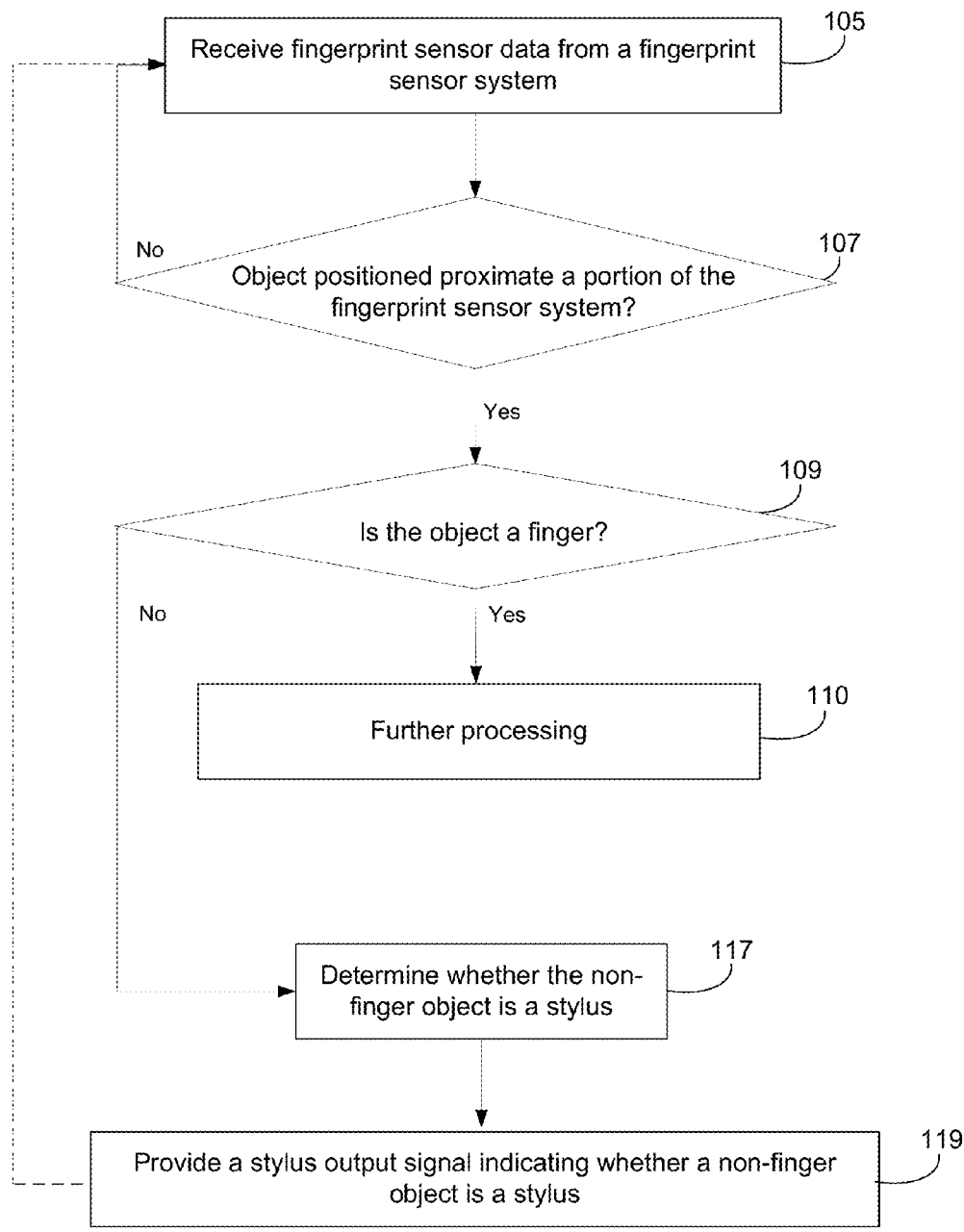

FIG. 1C is a flow diagram that provides additional examples of fingerprint sensing apparatus operations. The blocks of FIG. 1C may, for example, be performed by the control system 104 or by a similar apparatus. In this example, blocks 105 and 107 may be substantially as described above. Block 109 of FIG. 1C also may be substantially as described with reference to FIG. 1B.

However, in this example the finger/non-finger determination of block 109 triggers specific subsequent blocks.

Here, if it is determined in block 109 that an object is not a finger, the process continues to block 117, in which it is determined whether the non-finger object is a stylus. The determination of block 117 may be based upon one or more factors. For example, the control system 104 may determine whether the non-finger object is a stylus by evaluating the fingerprint sensor data to determine the object's size, the object's texture, the object's shape and/or other factors. In this example, the control system 104 is capable of providing a stylus output signal indicating whether a non-finger object is a stylus (block 119).

In the example shown in FIG. 1C, if it is determined in block 109 that an object is a finger, the process continues to block 110, in which further processing occurs. Some examples are described below.

Figure 1D:
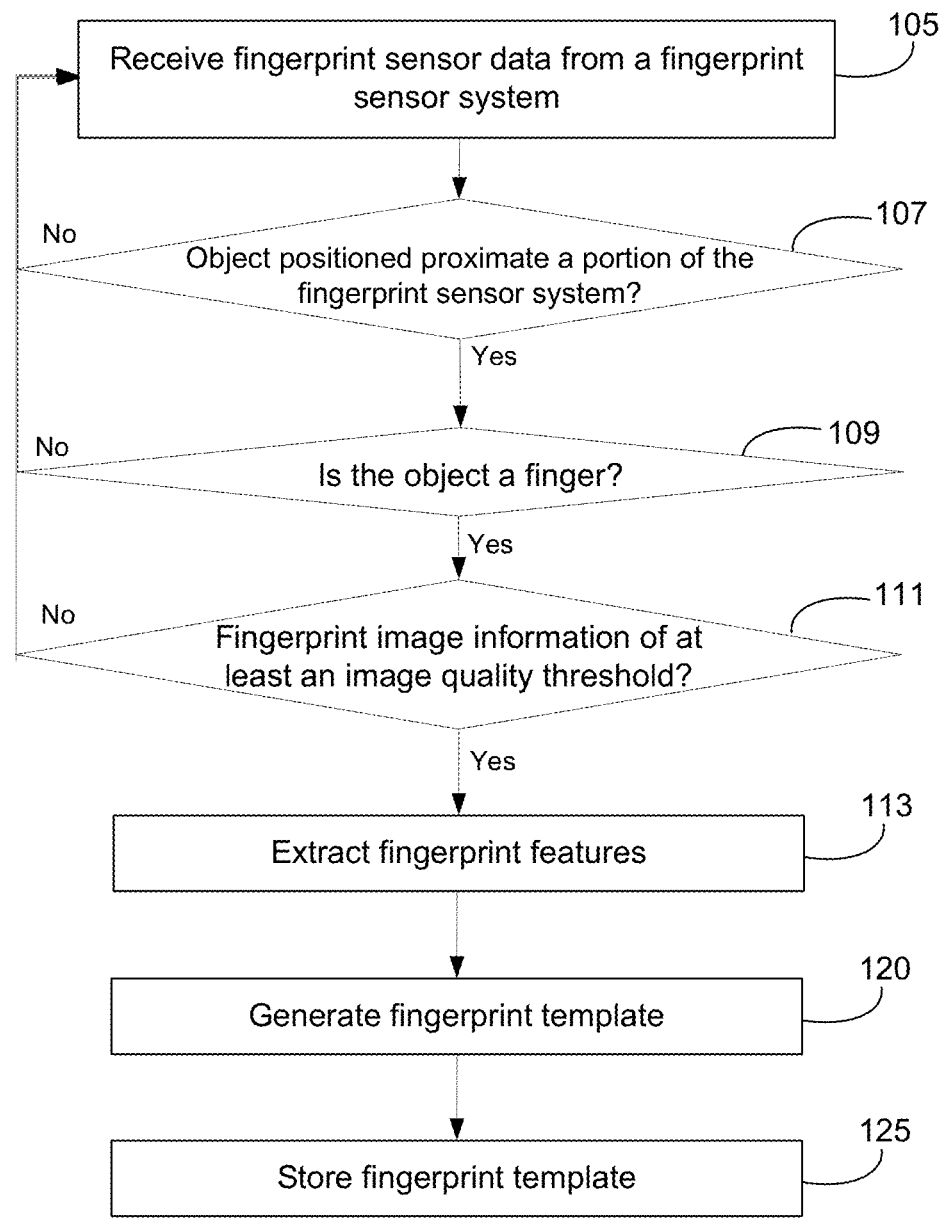

FIG. 1D is a flow diagram that provides additional examples of fingerprint sensing apparatus operations. In some implementations, the blocks shown in FIG. 1D may be blocks of an enrollment process. However, at least some blocks of FIG. 1D also may correspond to an authentication process in some examples. The blocks of FIG. 1D may be performed by the control system 104 or by a similar apparatus. In this example, blocks 105-107 may be substantially as described above. Block 109 of FIG. 1C also may be substantially as described with reference to FIGS. 1B and 1C.

However, in this example, if it is determined in block 109 that an object is a finger, it is determined in block 111 whether the fingerprint sensor data includes fingerprint image information of at least an image quality threshold. If not, no fingerprint features will be extracted in this implementation, but instead the process reverts to block 105 in this example. In some implementations, a control system 104 may be capable of providing an image quality output signal indicating an image quality score or level, or whether the image quality is above an image quality threshold.

For example, block 111 may involve determining whether the fingerprint sensor data includes fingerprint image information of a sufficiently high image quality to justify the computational burden of extracting fingerprint features. Such a determination may be particularly beneficial if the computational burden of extracting fingerprint features, subsequent enrollment and/or matching is significantly greater than the process of block 111. Accordingly, it may be desirable for the process of block 111 to be performed more quickly than the process of extracting fingerprint features (and/or other processes) and to be performed with a relatively smaller computational burden. Therefore, in some implementations block 111 may involve evaluating only a portion of the fingerprint sensor data that was received in block 105.

According to some implementations, block 111 may involve evaluating the fingerprint image information and making a signal and/or noise determination, such as a signal-to-noise ratio determination. Some implementations of block 111 may involve evaluating image contrast and/or image sharpness. Some implementations may involve evaluating the fingerprint image information to determine a topology of curves corresponding to ridge and valley structures. Some such implementations may involve determining a curve orientation field. In some examples, block 111 may involve evaluating image quality metrics such as the orientation of ridge flow, the clarity of ridge flow and/or ridge flow continuity. Some implementations of block 111 may involve evaluating the fingerprint image information for the existence of one or more fingerprint features such as minutia points. Signal-to-noise ratios (SNR) may be determined, for example, by dividing the relative amplitude of fingerprint sensor data corresponding to ridges of a fingerprint by the amplitude of the background (such as valleys of a fingerprint or from sensor data with no object positioned on the sensor platen). Image contrast may be determined, for example, by comparing the magnitude of the ridge data with the magnitude of the valley data, such as by generating a ratio between one or more ridges and one or more valleys of the fingerprint image data. Image sharpness may be determined, for example, by comparing the magnitudes of ridge data and valley data and dividing by the number of sensor pixels between an edge of a ridge and the floor of a valley. A topology of curves corresponding to ridges and valleys may be determined, for example, by constructing a vector field associated with the angular direction of the ridges and valleys disposed on a surface of the sensor platen. A curve orientation field may be determined, for example, by constructing a vector field associated with the curvature of the ridges and valleys (e.g., a relatively straight ridge or valley may have a small curvature and a highly curved ridge or valley such as a whorl may have a high curvature). Image quality metrics such as the orientation of ridge flow, the clarity of ridge flow, and/or ridge flow continuity may be determined, for example, by examining the angular direction, length, continuity and curvature of ridges within the fingerprint sensor data to assess whether a sufficient number of features are available to allow successful matching or to identify good images for enrollment templates.

Some implementations may involve evaluating the fingerprint image information and determining an image quality score. Some implementations that involve determining an image quality score may involve using the score only for a pass/fail determination in block 111. However, other implementations may involve retaining the image quality score and associating the image quality score with the fingerprint image information. For example some such implementations may involve retaining the image quality score and associating the image quality score with the fingerprint image information if the image quality score is sufficiently high for a "pass" determination in block 111 (resulting in further processing, such as proceeding to block 113), but is in a marginal range of image quality scores, e.g., less than a predetermined threshold score for high image quality.

In some implementations, an image quality threshold for a "pass" determination in block 111 may be different for an enrollment process than for an authentication process. For example, in some such implementations, an image quality threshold for a "pass" determination in block 111 may be higher for an enrollment process than for an authentication process. Such differentiation may provide several potential advantages. For example, it may be desirable to ensure that received fingerprint image information has a high image quality during an enrollment process, because the success of accurate future authentication processes will depend, at least in part, on the image quality obtained during the enrollment process. Moreover, a user may be more tolerant of the time spent during enrollment, as compared to the user's expectations for an authentication/verification process: in general, users may be less tolerant of delay during day-to-day use of a device. For example, a user enrolling one or more fingerprints on a mobile device may be provided with feedback such as a message or an icon on a display that a finger appears to be dirty when the image quality is low. In another example, a user attempting to be authenticated or verified may receive a message that a finger appears to be dirty or that the image quality is low when the image quality is low or an artificial finger is being used. An authentication process may, for example, validate or verify that a user is who he or she claims to be. An authentication process may include an identification sequence, where a particular user is determined from a set of one or more individuals or authorized users, such as one or more authorized users of a tablet computer or other shared mobile device.

In the example shown in FIG. 1D, if it is determined in block 111 that the fingerprint sensor data includes fingerprint image information of at least an image quality threshold, fingerprint features are extracted in block 113. The extracted fingerprint features may, for example, include pattern information and/or fingerprint minutiae such as ridge ending information, ridge bifurcation information, short ridge information, ridge flow information, island information, spur information, delta information, core information, etc.

In this example, block 120 involves generating a fingerprint template based, at least in part, on the fingerprint features extracted in block 113. For example, block 120 may involve generating fingerprint template information that may include the type, size, location and/or orientation of fingerprint patterns and/or fingerprint minutiae. Here, block 125 involves storing the fingerprint template generated in block 120. The length of time that the fingerprint template is stored may depend on whether the process is an enrollment process or an authentication process. If the latter, in some implementations the fingerprint template may be deleted after the authentication process is complete.

Figure 1E:
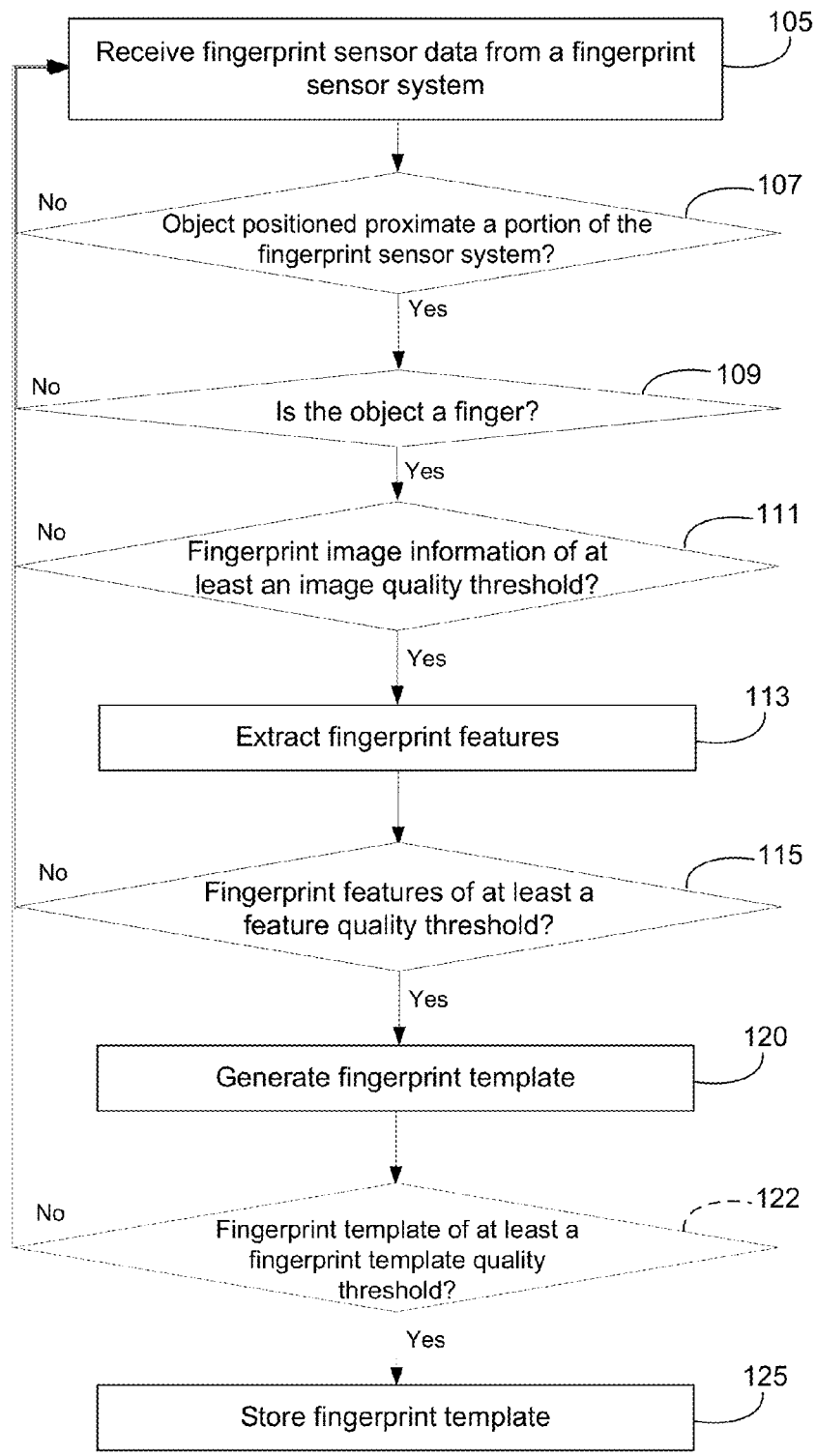

FIG. 1E is a flow diagram that provides additional examples of fingerprint sensing apparatus operations. In some implementations, the blocks shown in FIG. 1E may be blocks of an enrollment process. However, the blocks of FIG. 1E also may correspond to an authentication process in some examples. The blocks of FIG. 1E may be performed by the control system 104 or by a similar apparatus. In this example, blocks 105-113 may be substantially as described above.

However, the process outlined in FIG. 1E includes additional quality threshold determinations. In this example, after fingerprint features are extracted in block 113, it is determined in block 115 whether the extracted fingerprint features are of at least a feature quality threshold. If not, no fingerprint template will be created in this implementation, but instead the process reverts to block 105 in this example. In some implementations, the control system 104 may be capable of providing a feature quality output signal indicating a fingerprint feature quality, score or level, or whether the feature quality is above a feature quality threshold.

Block 115 may involve determining an extracted fingerprint feature quality. In some implementations, block 115 may involve determining a fingerprint feature quality score, which may be a numeric score in some implementations. The fingerprint feature quality determination and/or score may, for example, be an aggregate score based on multiple extracted fingerprint features. In some implementations, substantially all extracted fingerprint features will be evaluated in block 115, whereas in other implementations only a subset of the extracted fingerprint features will be evaluated in block 115. In some implementations, one or more feature quality scores or levels may be stored with the corresponding fingerprint features.

According to some implementations, block 115 may involve evaluating the extracted fingerprint features and making a signal and/or noise determination, such as a signal-to-noise ratio determination. Some implementations of block 115 may involve evaluating feature image contrast and/or feature image sharpness. Some implementations of block 115 may involve evaluating the orientation of image patterns within the fingerprint image information. Some implementations of block 115 may involve evaluating continuity of image patterns. Some implementations of block 115 may involve determining a power spectrum distribution of the fingerprint image information to ascertain, for example, the relative quantity and magnitude of ridge data and valley data. Some implementations of block 115 may involve evaluating ridge/valley flow quality. Some implementations of block 115 may involve assessing the quality of one or more minutia points in the fingerprint image information, such as determining the contrast of the image in the region of a minutia point and assigning a value corresponding with the local contrast to the minutia point (e.g., a minutia point with a higher quality may carry more weight during subsequent matching operations than a minutia point with lower quality). Some implementations of block 115 may involve determining the wavelet-level decomposition component quality of the image information in correspondence with wavelet decomposition, for example, of ridge-valley-ridge features.

In some implementations, block 115 may involve determining whether a feature has a sufficient level to be recognized. For example, some such implementations may involve determining a feature recognition confidence level and/or a feature recognition confidence level score. The feature recognition confidence level score may be based, at least in part, on the fingerprint feature quality determination and/or score. However, in some implementations the feature recognition confidence level score also may be based on an image quality score. For example, in some implementations the feature recognition confidence level score may be based on a composite score that is based, at least in part, on a fingerprint feature quality score and an image quality score. Some such implementations may involve applying a weighting factor to one of the scores. In some implementations, a control system may be capable of providing a recognition confidence level output signal indicating a recognition confidence level of a fingerprint feature or template, and/or whether the recognition confidence level for the feature or template is above a recognition confidence level threshold.

According to some implementations, block 115 may be an optional process. For example, the extracted fingerprint feature quality determination of block 115 may be invoked if the image quality score is sufficiently high for a "pass" determination in block 111 (resulting in further processing, such as proceeding to block 113), but is in a marginal range of image quality scores, e.g., less than a predetermined threshold score for high image quality. If the image quality score is above the predetermined threshold score for high image quality, block 115 may be omitted in some examples.

In this example, block 120 involves generating a fingerprint template based, at least in part, on the fingerprint features extracted in block 113. For example, block 120 may involve generating fingerprint template information that may include the type, size, location and/or orientation of fingerprint patterns and/or fingerprint minutiae.

Here, optional block 122 involves determining whether the fingerprint template is of at least a fingerprint template quality threshold. If not, the fingerprint template will not be stored in this implementation, but instead the process reverts to block 105.

Accordingly, block 122 involves determining a fingerprint template quality in this example. The process of determining a fingerprint template quality may be similar to that of determining fingerprint feature quality. However, determining a fingerprint template quality also may involve determining other factors, such as whether there is a sufficient number of high-quality fingerprint features in the fingerprint template, whether high-quality fingerprint features are distributed over a large enough area for a reliable template match, the sharpness of the image, image contrast, continuity of patterns, etc. For example, the fingerprint template quality may be an aggregate of the fingerprint feature quality, such as a count of the fingerprint features in the fingerprint template that have a feature quality score assigned to them, or a sum of the feature quality scores for each feature in the template. In this implementation, a high-quality template may have an abundance of high-quality features, whereas a relatively low-quality template may have only a few features with high quality or a larger number of features with low quality. During enrollment, for example, a user of a mobile device may be requested to provide one or more additional fingerprint images if an initial fingerprint image has insufficient feature quality or insufficient template quality to ensure accurate matching and authentication during subsequent access attempts. During matching, for example, features with the highest quality may be used prior to features with lower quality to determine a match score. Similarly, a template with high quality for one portion of a fingerprint may be used for matching prior to determining a match from a template from a different portion (overlapping or non-overlapping) of the same enrolled finger. In some implementations, block 122 may involve determining a fingerprint template quality score and determining whether the fingerprint template quality score exceeds a threshold. In some implementations, the fingerprint template quality score may be based, at least in part, on minutiae quality and/or feature quality. In some implementations, the fingerprint template quality score may be based, at least in part, on the quantity of minutiae and/or features in the corresponding fingerprint image information. In some implementations, the fingerprint template quality score may be based, at least in part, on image contrast and/or image gradient information. In some implementations, the fingerprint template quality score may be based, at least in part, on ridge orientation quality, ridge frequency and/or ridge flow quality. In some implementations, the fingerprint template quality score may be based, at least in part, on a template matching score. The template matching score, in turn, may be based on the extent of a match with a previously-obtained fingerprint template, e.g., as described below with reference to FIG. 1F. In some implementations, a control system may be capable of providing a template quality output signal indicating a template quality score or level, and/or whether the template quality is above a template quality threshold.

Here, block 125 involves storing the fingerprint template generated in block 120. The length of time that the fingerprint template is stored may depend on whether the process is an enrollment process or an authentication process. If the process is an authentication process, the fingerprint template may be deleted after the authentication process is complete in some implementations. However, as noted below, some implementations may involve making further use of at least a portion of a fingerprint template. Some such implementations may involve updating a previously-obtained fingerprint template. In some implementations, the template quality output signal may be stored with the fingerprint template. In some implementations, one or more feature quality scores corresponding to one or more fingerprint features may be stored with the fingerprint template. In some implementations, the recognition confidence level output signal for a fingerprint feature or template may be stored with the fingerprint template.

Figure 1F:
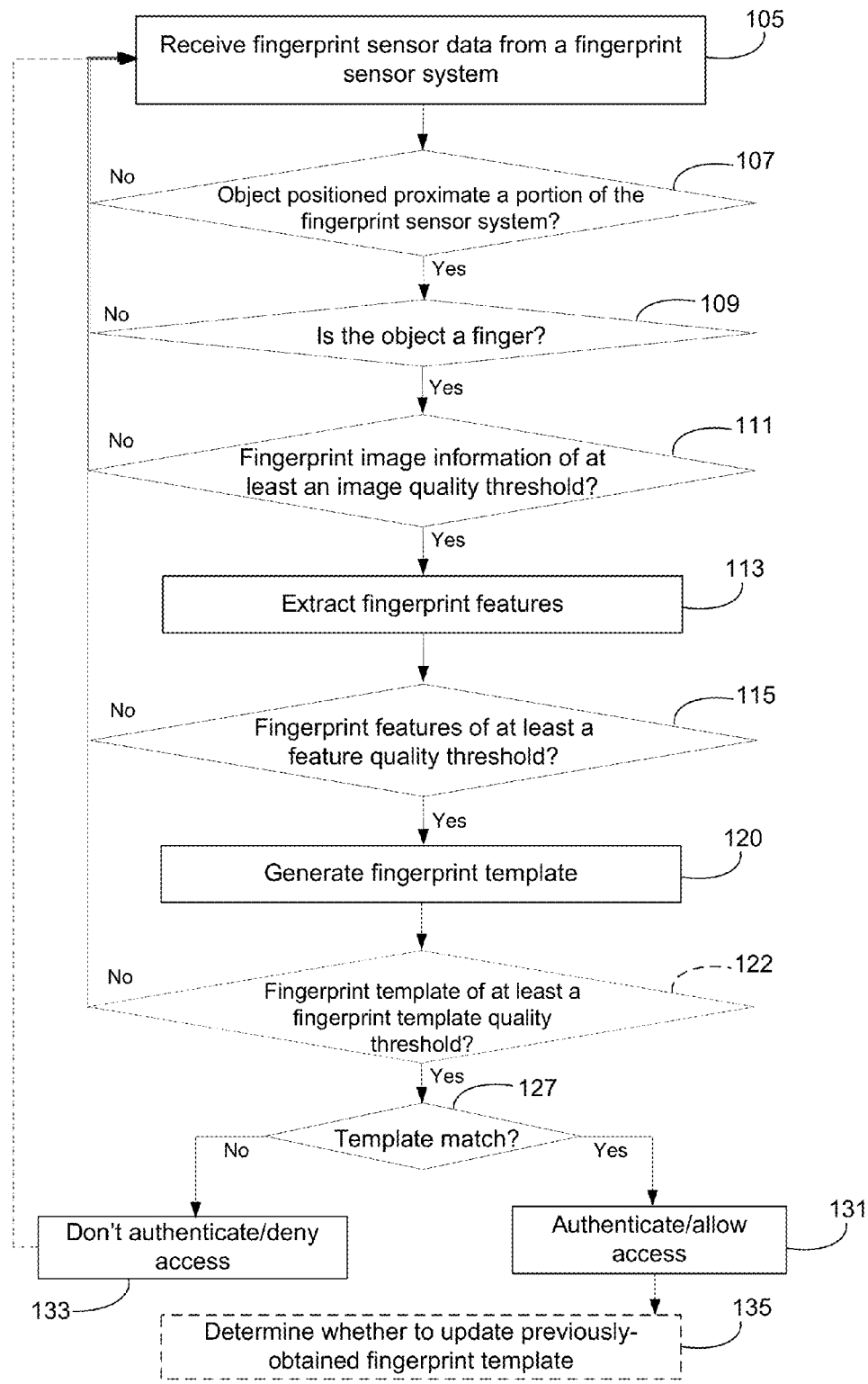

FIG. 1F is a flow diagram that provides additional examples of fingerprint sensing apparatus operations. In this example, the blocks shown in FIG. 1F are blocks of an authentication process. The blocks of FIG. 1F may be performed by the control system 104 or by a similar apparatus. In this example, blocks 105-122 may be substantially as described above.

However, in this implementation, it is determined in block 127 whether there is a fingerprint template match. In this example, block 127 involves comparing the fingerprint template with a previously-obtained fingerprint template and determining whether the fingerprint template matches the previously-obtained fingerprint template. In some implementations, block 127 may involve determining a template matching score that indicates how closely the fingerprint template matches the previously-obtained fingerprint template.

If it is determined in block 127 that there is no match (and/or that a template matching score is too low), a user will not be authenticated (block 133). Access to a device, such as a device that includes a fingerprint sensing apparatus, may be denied. In some implementations, block 133 may involve declining to authorize a purchase or other financial transaction. In this example, the process reverts to block 105.

However, if it is determined in block 127 that there is a match (and/or that a template matching score is sufficiently high), in this example the process continues to block 131, in which a user is authenticated. For example, if the authentication process is being performed by a fingerprint sensing apparatus of a mobile display device, block 131 may involve allowing a user access to the mobile display device. In some implementations, block 131 may involve authorizing a purchase or other financial transaction.

Optional block 135 involves determining whether to update the previously-obtained fingerprint template. For example, in some implementations, the previously-obtained fingerprint template may be updated if it is determined in block 127 that there is a match and if the fingerprint template includes at least some features that are not found in the previously-obtained fingerprint template. In some implementations, the previously-obtained fingerprint template may be updated only if the matching score is sufficiently high, indicating a high degree of confidence that the fingerprint template and the previously-obtained fingerprint template correspond to the same digit of the same user. Alternatively, or additionally, the determination of whether to update the previously-obtained fingerprint template may be based, at least in part, on a quality score, such as an image quality score, a feature quality score and/or a template quality score.

Accordingly, updating a previously-obtained fingerprint template may involve augmenting the previously-obtained fingerprint template to include new features. Alternatively, or additionally, updating a previously-obtained fingerprint template may involve replacing features of the previously-obtained fingerprint template with new feature information based on higher-quality images, updating feature location data, etc. Such updating features may be desirable for several reasons. For example, a typical user may not understand how to provide high-quality fingerprint image information. A user may, for example, press too hard on a fingerprint sensor area and distort the natural patterns and/or shapes of fingerprint ridges and other features. In some implementations, fingerprint sensor data may be obtained from a relatively small fingerprint sensor. The fingerprint sensor may, in some instances, be smaller than a typical human finger. Therefore, fingerprint sensor data from the fingerprint sensor system will correspond to only a portion of a total fingerprint.

FIGS. 2A-2L show examples of partial fingerprint images and fingerprint features. In this example, FIGS. 2A-2L are a group of partial fingerprint images 13 that have been obtained from a relatively small fingerprint sensor with an approximately square active area during multiple iterations of a process that includes obtaining fingerprint sensor data, which may be similar to one or more of the processes described above with reference to FIGS. 1B-1F. Each of the partial fingerprint images 13 may correspond with a subset of fingerprint image information that has been obtained during an iteration of the process. According to some such implementations, a subset of fingerprint features corresponding to each of the partial fingerprint images 13 may be extracted from each corresponding subset of fingerprint image information and a partial fingerprint template may be generated. The partial fingerprint template may, for example, include the types, locations and/or spacing of the fingerprint minutiae 205g shown in FIG. 2B and/or the fingerprint minutiae 205b shown in FIG. 2H. The partial fingerprint template may correspond with features shown in one or more of the partial fingerprint images 13.

Figures 2A, 2B, 2C, 2D, 2E, 2F, 2G, 2H, 2I, 2J, 2K, 2L:
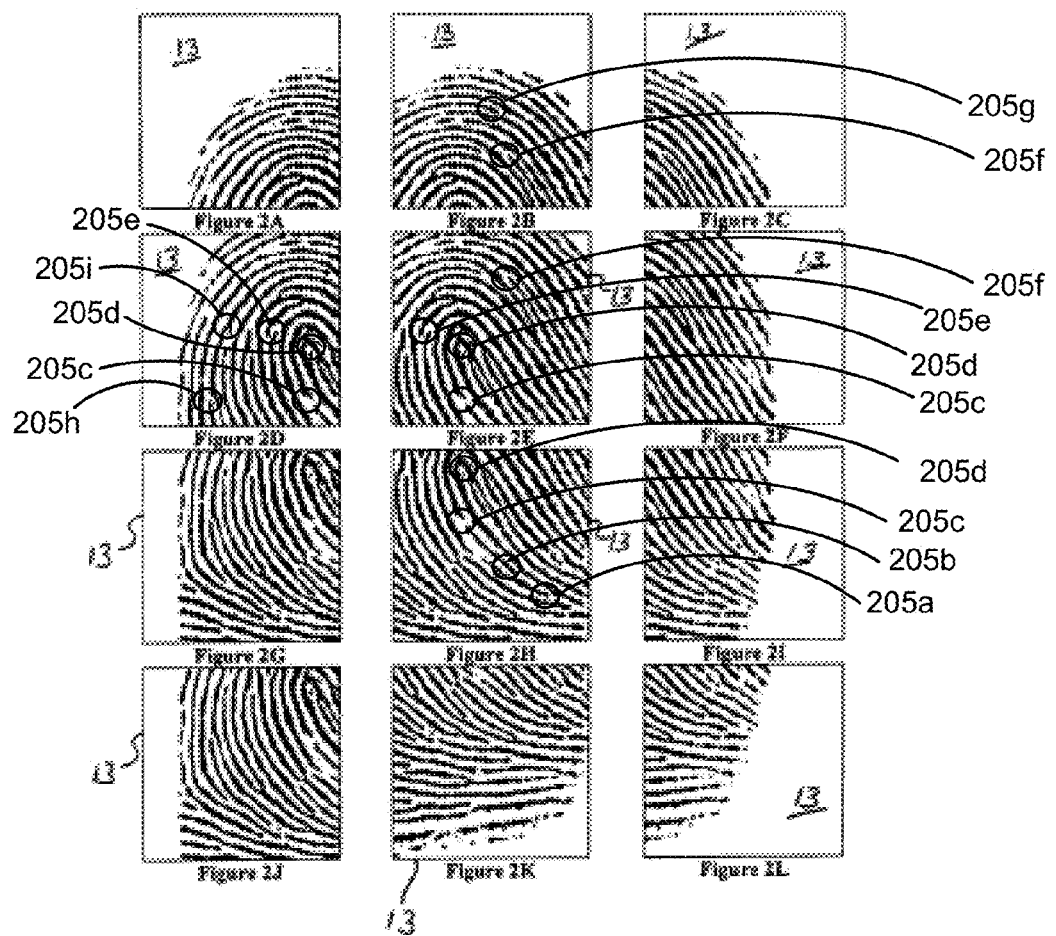
FIGS. 2A-2L show examples of partial fingerprint images and fingerprint features.

Some of the subsets of fingerprint image information shown in the partial fingerprint images 13, such as those shown in FIGS. 2E and 2H, may be deemed to include a sufficient number of fingerprint features for an enrollment process. In some implementations, a subset of fingerprint features corresponding to one or more of the partial fingerprint images 13 may have been extracted from a corresponding subset of fingerprint image information during an enrollment process, and a partial fingerprint template may have been generated and stored. This partial fingerprint template, which would then correspond to an initial version of a "previously-obtained fingerprint template" disclosed herein, could be used as a reference for subsequent authentication procedures, such as those described above with reference to FIG. 1F. In some implementations, more than one fingerprint template may be generated and stored for a single finger.

However, in connection with such subsequent authentication procedures, the previously-obtained fingerprint template(s) may be updated. For example, suppose that the initial version of the previously-obtained fingerprint template had been based on the subset of fingerprint image information corresponding with the partial fingerprint image 13 of FIG. 2H. In this example, the initial version of the previously-obtained fingerprint template may include fingerprint features corresponding to the fingerprint minutiae 205a-205d and various other fingerprint features that may be observed in FIG. 2H.

In connection with a subsequent authentication procedure, a new fingerprint template may be based on a subset of fingerprint image information corresponding with the partial fingerprint image 13 of FIG. 2E. The new fingerprint template may include fingerprint features corresponding to the fingerprint minutiae 205c-205f and various other fingerprint features that may be observed in FIG. 2E. Assuming that there is sufficient match between the initial version of the previously-obtained fingerprint template and the new fingerprint template, in some implementations the initial version of the previously-obtained fingerprint template may be updated to include at least some of the new fingerprint features, such as the fingerprint features corresponding with the fingerprint minutiae 205e and 205f. Some relevant methods and devices are disclosed in paragraphs [0022]-[0055] and the corresponding figures of U.S. patent application Ser. No. 13/107,635, entitled "Ultrasonic Area-Array Sensor with Area-Image Merging" and filed on May 13, 2011, which material is hereby incorporated by reference.

In a similar fashion, a subsequent authentication procedure may involve generating a new fingerprint template based on a subset of fingerprint image information corresponding with the partial fingerprint image 13 of FIG. 2B. Assuming that there is sufficient match between the updated version of the previously-obtained fingerprint template and the new fingerprint template, in some implementations the updated version of the previously-obtained fingerprint template may be updated again to include new fingerprint features, such as the fingerprint features corresponding with the fingerprint minutia 205g. Likewise, a subsequent authentication procedure may involve generating a new fingerprint template based on a subset of fingerprint image information corresponding with the partial fingerprint image 13 of FIG. 2D. Assuming that there is sufficient match between the updated version of the previously-obtained fingerprint template and the new fingerprint template, in some implementations the updated version of the previously-obtained fingerprint template may be updated again to include new fingerprint features, such as the fingerprint features corresponding with the fingerprint minutiae 205h and 205i.

Figure 3:
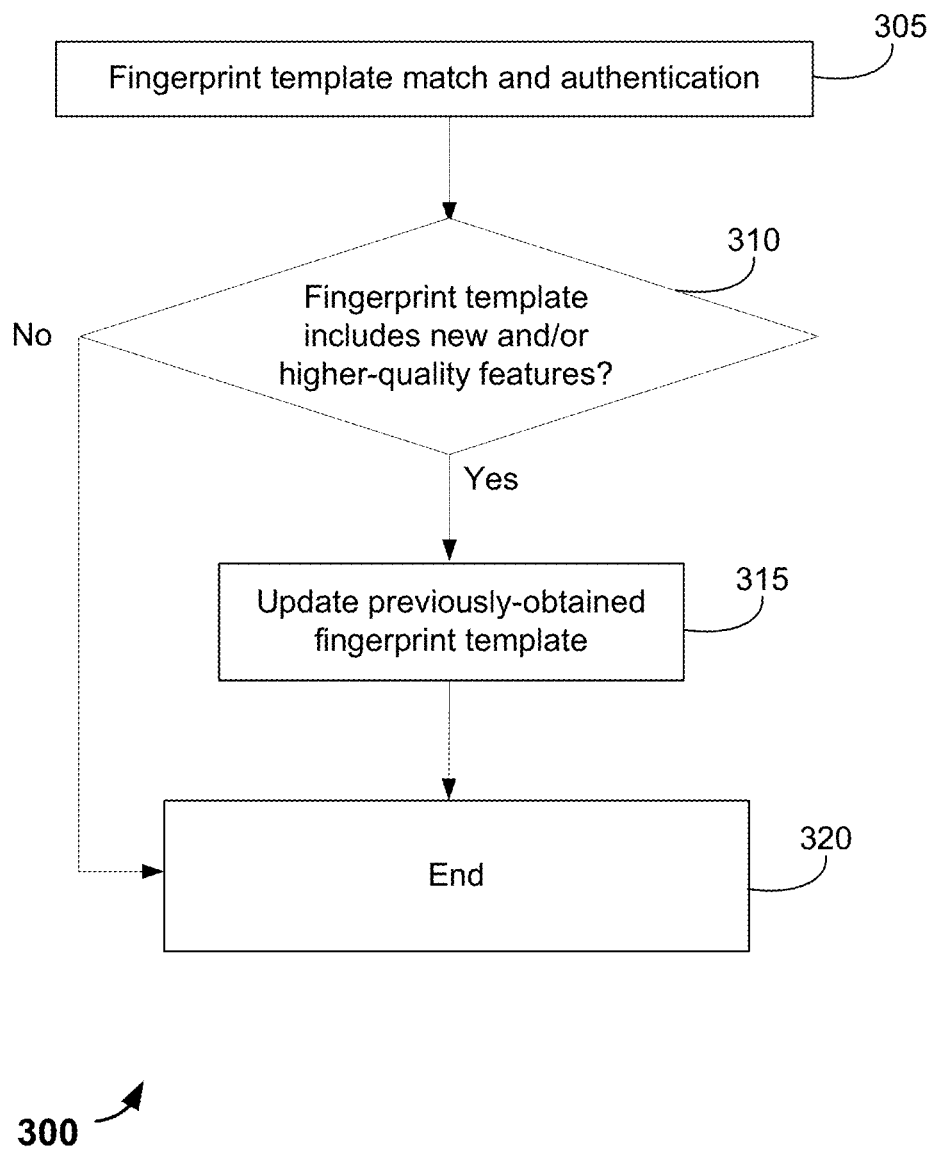
FIG. 3 is a flow diagram that outlines examples of some methods of updating a previously-obtained fingerprint template.

FIG. 3 is a flow diagram that outlines examples of some methods of updating a previously-obtained fingerprint template. In this example, method 300 begins with block 305, which involves matching a new fingerprint template with a previously-obtained fingerprint template and a subsequent authentication. In some implementations, block 305 may be similar to blocks 127 and 131 of FIG. 1F. However, in other implementations, block 305 may involve other template matching and authentication processes. For example, block 305 may involve matching a fingerprint template that has been generated without one or more of the quality threshold determinations shown in FIG. 1F.

In this example, block 310 involves determining whether the new fingerprint template includes new and/or higher-quality fingerprint features, as compared to those of the previously-obtained fingerprint template. If so, the previously-obtained fingerprint template may be updated to include the new and/or higher-quality fingerprint features in block 315.

According to some such implementations, the updating process may involve augmenting the previously-obtained fingerprint template to include new fingerprint features, e.g., as described above with reference to FIGS. 2A-2L.

Alternatively, or additionally, the updating process of block 315 may involve adapting the previously-obtained fingerprint template. In some implementations, such adapting may involve replacing fingerprint features of the previously-obtained fingerprint template with higher-quality corresponding features of the new fingerprint template.

In some implementations, the updating process of block 315 may involve adapting data corresponding to minutiae spacing of the previously-obtained fingerprint template. As a child grows, for example, his or her digits will become larger and the spacing between minutiae will increase. However the types and relative positions of the minutiae may remain substantially the same. Accordingly, the new fingerprint template may still match a previously-obtained fingerprint template, even though the spacing between minutiae may have increased to some degree. Block 315 may involve updating the previously-obtained fingerprint template by changing, scaling, or otherwise adapting data corresponding to the spacing between at least some of the minutiae. In this example, the process ends in block 320.

However, some implementations involve multiple iterations of the blocks shown in FIG. 3.

Various examples of object detection are disclosed herein, including implementations for determining whether air or an object is proximate a portion of a fingerprint sensor system. The air/object determination may be useful in determining, for example, whether a fingerprint sensor has been accidentally activated because a mobile device is moved or because a mobile device contacts a surface, such as the inside of a pocket, etc.

Some implementations may involve making an air/object determination before further processing of possible fingerprint image data. In some examples, further processing of a possible fingerprint image only takes place if the air/object determination indicates that image data corresponding to an object (rather than air) has been acquired. If not, the process may terminate and one or more new fingerprint images may be obtained. Such implementations may provide short access times and high accuracy, while minimizing computing time and resources.

Various approaches may be used for the air/object determination, depending on the particular implementation. Some approaches may involve evaluating image uniformity. Air proximate the surface of a sensor system tends to produce "plain" images that have smaller signal variations than those of a non-air substance or object. Objects, especially objects with surface patterns, may introduce larger signal variations. Accordingly, in some implementations, the air/object determination may involve determining statistical variance values for a collection of image data blocks as a measure of higher signal variation (corresponding to an object) or smaller signal variations (corresponding to air). Some implementations may involve block-based variance determinations, which may be sufficient for the air/object determination and which may be performed quickly. For example, in some implementations block-based variance determinations sufficient for the air/object determination may be performed in less than one millisecond. However, in alternative implementations such block-based variance determinations may be performed within a different time interval, e.g., in approximately one millisecond or in more than one millisecond.

Figure 4A:
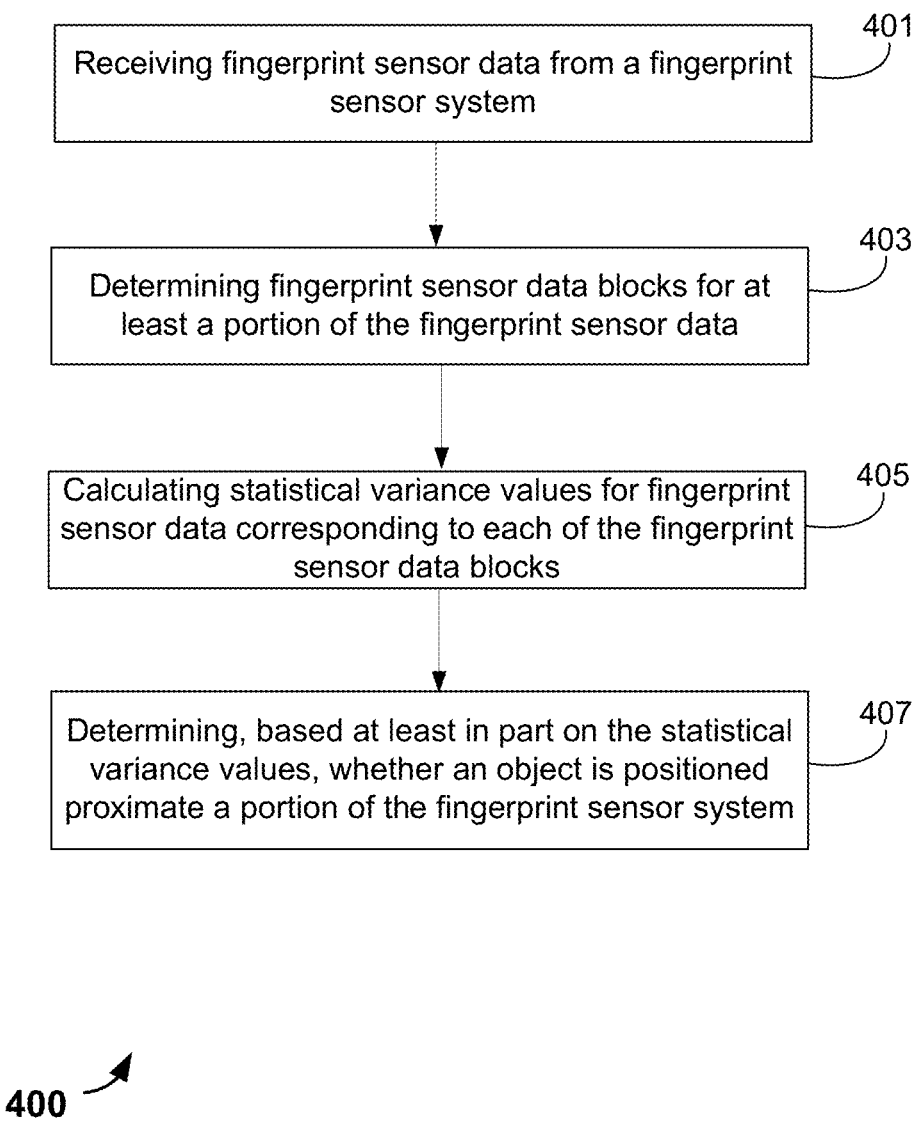
FIG. 4A is a flow diagram that provides examples of object detection operations.

FIG. 4A is a flow diagram that provides examples of object detection operations. At least some blocks of FIG. 4A (like those of other flow diagrams provided herein) may be performed by the control system 104 of FIG. 1A or by a similar apparatus. As with other methods disclosed herein, the method outlined in FIG. 4A may include more or fewer blocks than indicated. Moreover, the blocks are not necessarily performed in the order indicated.

Here, block 401 involves receiving fingerprint sensor data from a fingerprint sensor system. The fingerprint sensor system may, for example, be the fingerprint sensor system 102 of FIG. 1A or a similar apparatus. Accordingly, some blocks of FIG. 4A are described below with reference to implementations of the control system 104 and/or the fingerprint sensor system 102.

In this example, block 403 involves determining fingerprint sensor data blocks for at least a portion of the fingerprint sensor data. In some implementations, the process of determining fingerprint sensor data blocks may involve mapping fingerprint sensor pixel position data (e.g., x-y coordinate data, row/column position data, etc.) to fingerprint sensor data blocks. Accordingly, in some examples the fingerprint sensor data blocks may correspond to blocks of fingerprint sensor pixels of a fingerprint sensor system. Some examples are described below with reference to FIGS. 4B-4D.

Here, block 405 involves calculating statistical variance values for fingerprint sensor data corresponding to each of the fingerprint sensor data blocks. Some examples may involve calculating variance according to a naïve algorithm, a two-pass algorithm, an online algorithm, a weighted incremental algorithm, a parallel algorithm, etc. In some implementations, block 405 may involve calculating standard deviation values for fingerprint sensor data corresponding to each of the fingerprint sensor data blocks. In some examples, block 405 may involve calculating absolute deviation values for fingerprint sensor data corresponding to each of the fingerprint sensor data blocks. In some implementations, block 405 may involve calculating the variance of relative changes in signal levels between neighboring pixels or neighboring blocks of pixels. In some implementations, block 405 may involve determining the variance of angular orientations of image gradients for selected pixels or blocks of pixels in the sensor array.

Air on a platen surface tends to produce images that have weaker gradients than those of a non-air substance or object. Therefore, alternative implementations may involve calculating a statistical variance of fingerprint sensor signal gradient information. In some such implementations, the air/object determination may involve determining a standard deviation of fingerprint sensor signal gradient information in fingerprint sensor data blocks. The existence of strong gradients may correspond to an object and a preponderance of weak gradients may correspond to air.

Some implementations, such as implementations wherein block 401 involves receiving raw fingerprint sensor data from a fingerprint sensor system, may involve pre-processing the fingerprint sensor data. For example, some implementations may include one or more pre-processing blocks between block 401 and block 405 (before and/or after block 403). Such pre-processing may, for example, involve or include gain compensation, offset adjustments, background subtraction, de-noise operations, contrast enhancement, scaling, linearization, clipping, dead or low-performing pixel identification and exclusion, and/or other processes. Some filtering examples are described below with reference to FIG. 4E.

According to the implementation shown in FIG. 4A, block 407 involves determining, based at least in part on the statistical variance values, whether an object is positioned proximate a portion of the fingerprint sensor system. In some implementations, a control system may be capable of providing an object output signal indicating whether an object or a non-object (e.g., air) is positioned proximate a portion of the fingerprint sensor system. In some implementations, a control system may be capable of providing an air/non-air output signal indicating whether air or a non-air material is positioned proximate a portion of the fingerprint sensor system.

Figure 4B:
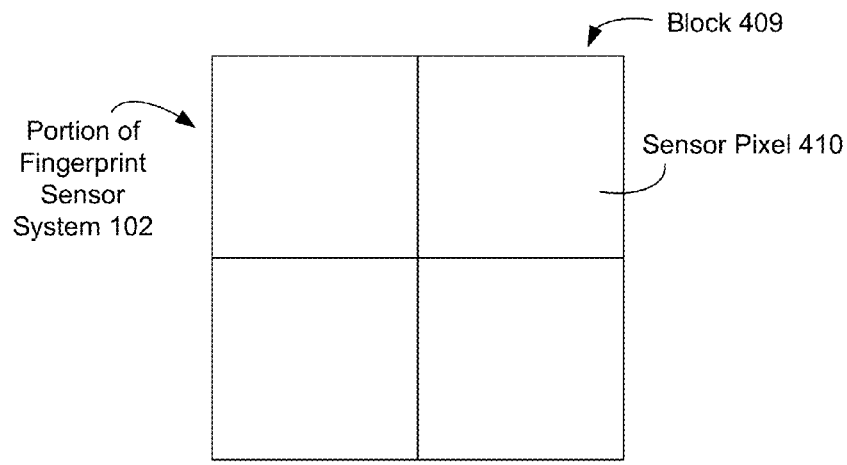
FIGS. 4B-4D show examples of fingerprint sensor data blocks.
Figure 4C:
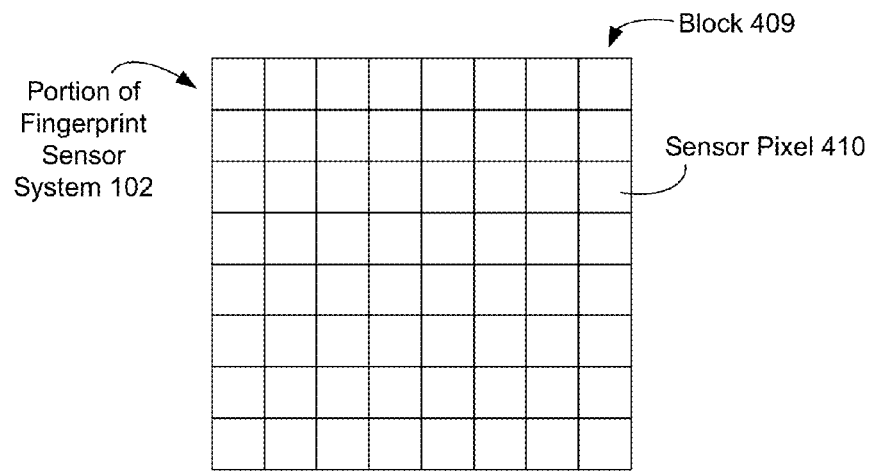
Figure 4D:
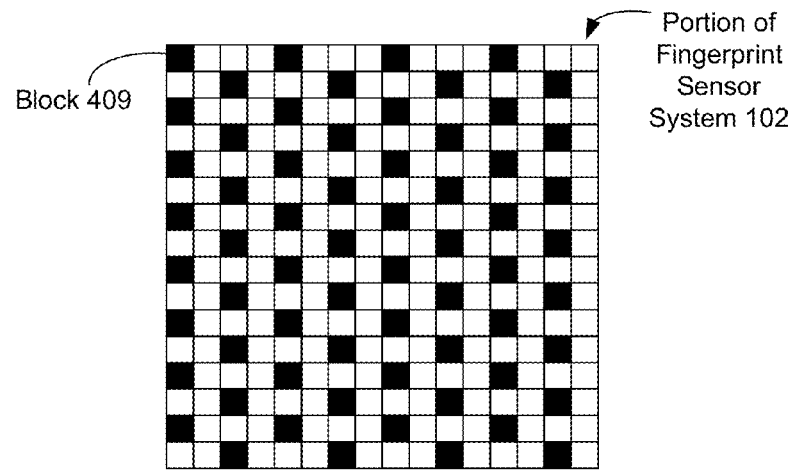

FIGS. 4B-4D show examples of fingerprint sensor data blocks. Each of FIGS. 4B-4D shows a portion of a fingerprint sensor system, such as the fingerprint sensor system 102 shown in FIG. 1A.

FIG. 4B shows an example of a single fingerprint sensor data block 409. In the example of FIG. 4B, the fingerprint sensor data block 409 includes four fingerprint sensor pixels 410. However, a fingerprint sensor data block 409 may include more or fewer than four fingerprint sensor pixels 410. In the implementation shown in FIG. 4C, for example, the fingerprint sensor data block 409 includes 64 fingerprint sensor pixels 410. In other implementations, a fingerprint sensor data block 409 may include more or fewer than 64 fingerprint sensor pixels 410. For example, in alternative implementations a fingerprint sensor data block 409 may include 9, 16, 25, 36, 49, 81, 100, 121, 144, 169, 196, 225, 256, 289, 324, 361, 400, 441, 484, 529, 576, 625, 676, 729, 784, 841, 900, 961, 1024 or more fingerprint sensor pixels 410. Such fingerprint sensor data blocks 409 may be square or substantially square. In alternative implementations, a fingerprint sensor data block 409 may include different numbers of fingerprint sensor pixels 410, such as blocks of 4, 8, 16, 32, 64, etc., that are powers of two. Such fingerprint sensor data blocks 409 may have other shapes, such as rectangular shapes that are not square shapes. In some implementations, the sensor pixels 410 within a block 409 may be contiguous such as in a line or a rectangle. In some implementations, one or more sensor pixels 410 within a block 409 may be non-contiguous. In some implementations, the sensor pixels 410 within a block 409 may be sparse and separated by one or more sensor pixels 410 that are not part of the block. In some implementations, the sensor pixels 410 within a block 409 may be a portion or all of a scan line, one or more adjacent scan lines, one or more non-adjacent scan lines, or a set of interleaving scan lines.

In some implementations, each of the fingerprint sensor data blocks 409 may include the same number of fingerprint sensor pixels 410. However, in alternative implementations, different fingerprint sensor data blocks 409 of the same array may include different numbers of fingerprint sensor pixels 410. In one such example, some instances of the fingerprint sensor data blocks 409 may include a first number of fingerprint sensor pixels 410 (e.g., 16) and other instances of the fingerprint sensor data blocks 409 may include a second number of fingerprint sensor pixels 410 (e.g., 256). Accordingly, in some implementations the fingerprint sensor data blocks 409 may have at least two different sizes or shapes.

According to some implementations, each of the fingerprint sensor data blocks 409 may be contiguous. In some such implementations, the fingerprint sensor data blocks 409 may include substantially all of the fingerprint sensor pixels 410 of the fingerprint sensor system 102.

However, in some alternative implementations, at least some of the fingerprint sensor data blocks 409 may be non-contiguous. In FIG. 4D, for example, non-contiguous fingerprint sensor data blocks 409 are shown as black squares. The white squares represent areas that are not fingerprint sensor data blocks 409. Accordingly, in this example most of the fingerprint sensor pixels 410 of the fingerprint sensor system 102 are not included in the fingerprint sensor data blocks 409. Evaluating only a portion of the fingerprint sensor pixels 410 of the fingerprint sensor system 102 may be relatively faster and more efficient than evaluating all of the fingerprint sensor pixels 410, while still providing an accurate air/object determination.

Figure 4E:
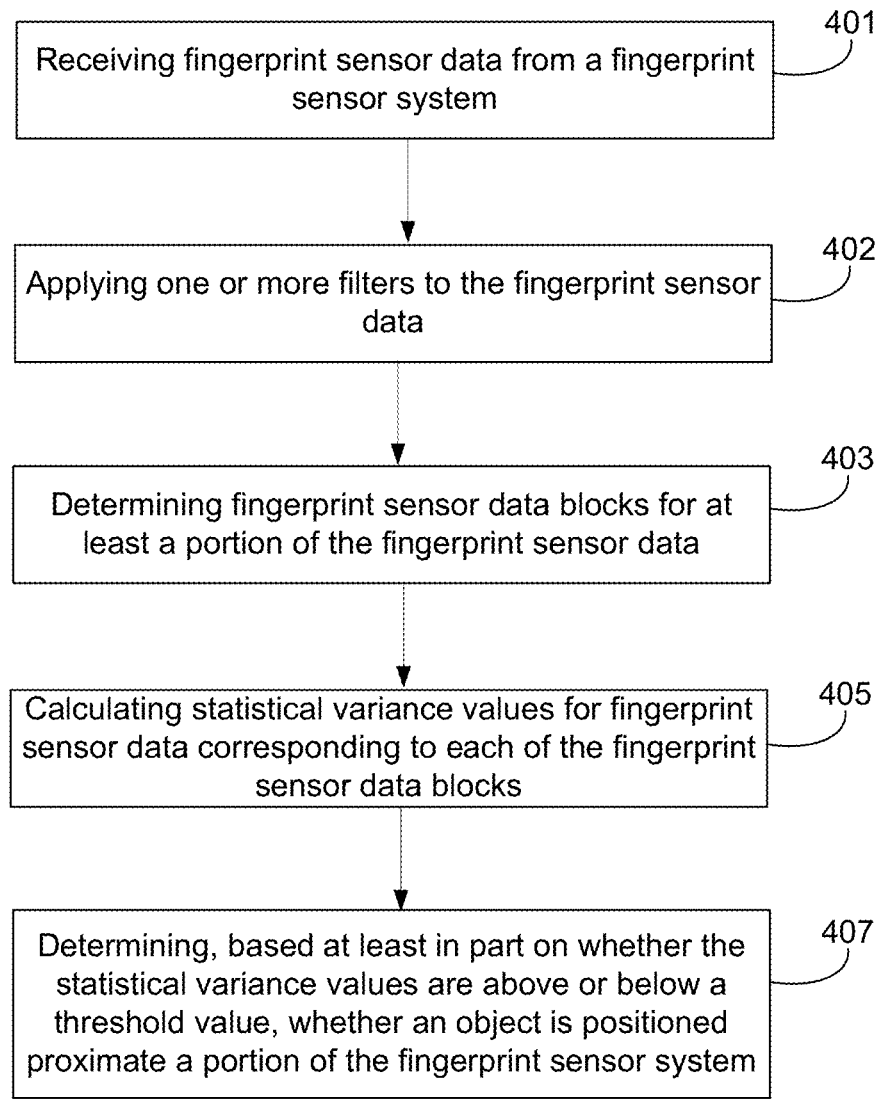
FIG. 4E is a flow diagram that provides additional examples of object detection operations.

FIG. 4E is a flow diagram that provides additional examples of object detection operations. At least some blocks of FIG. 4E may be performed by the control system 104 of FIG. 1A or by a similar apparatus. In some implementations, blocks 401, 403 and 405 may be substantially as described above with reference to FIG. 4A.

However, this example involves applying one or more filters to the fingerprint sensor data before calculating the statistical variance values in block 405. In this example, the filters are applied in block 402, before determining the fingerprint sensor data blocks in block 403. However, in alternative implementations, the filters may be applied after determining the fingerprint sensor blocks. For example, the one or more filters may include a band-pass filter, a low-pass filter, a median filter, a de-noise filter, a Gaussian filter, a wavelet filter and/or a running-average filter. In some implementations, the filter or filters may pass a range of spatial frequencies corresponding to fingerprint features.

As before, block 407 involves determining, based at least in part on the statistical variance values, whether an object is positioned proximate a portion of the fingerprint sensor system. In the example shown in FIG. 4E, block 407 specifically involves determining, based at least in part on whether the statistical variance values are above or below a threshold value, whether an object is positioned proximate a portion of the fingerprint sensor system. As noted elsewhere herein, the statistical variance values may be based, at least in part, on a fingerprint sensor signal value or a fingerprint sensor signal gradient.

Figures 4F, 4G:
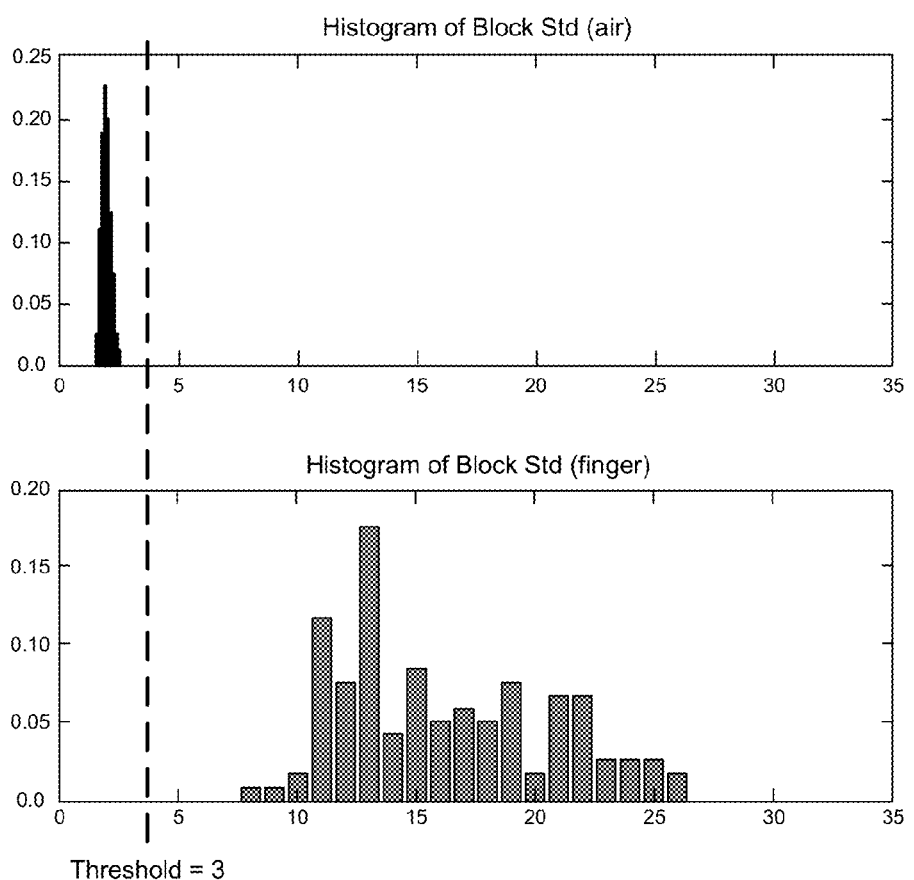
FIGS. 4F and 4G show examples of air/object determination based, at least in part, on whether statistical variance values are above or below a threshold value.

FIGS. 4F and 4G show examples of air/object determination based, at least in part, on whether statistical variance values are above or below a threshold value. In this example, 120 fingerprint sensor data blocks have been evaluated. However, alternative implementations may involve evaluating more or fewer fingerprint sensor data blocks. The fingerprint sensor data blocks may or may not be contiguous and may or may not include all of the fingerprint sensor pixels of a fingerprint sensor system, depending on the particular implementation.

As shown in FIG. 4F, 40 of the fingerprint sensor data blocks correspond with fingerprint sensor data having a standard deviation of less than 3, whereas 80 of the fingerprint sensor data blocks correspond with fingerprint sensor data having a standard deviation of more than 3. FIG. 4G is a pair of bar graphs that show histograms of underlying standard deviation data.

As noted above, air proximate the surface of a sensor system tends to produce "plain" images that have smaller signal variations than those of a non-air substance or object. Objects, especially objects with surface patterns, may introduce larger signal variations. Accordingly, in this example, block 407 involves determining that no object is proximate the 40 fingerprint sensor data blocks corresponding to a standard deviation of less than 3 and determining that an object is proximate the 80 fingerprint sensor data blocks corresponding to a standard deviation of more than 3.

In this example shown in FIG. 4G, the standard deviations of blocks corresponding to air are clustered in a range between about 1.5 and 2.7, whereas the standard deviations of blocks corresponding to an object are broadly distributed in a range from about 7.3 to more than 25. No blocks correspond with standard deviations in the range from about 1.5 to about 7.3. Accordingly, in alternative implementations block 407 may involve other methods of air/object determination that are based, at least in part, on statistical variance values. For example, such methods could be based on thresholds other than 3, such as 4 or 5. In some implementations, the threshold may be adaptively set to increase or decrease the confidence level when determining an object or air. In alternative implementations, a dual threshold may be used to provide some hysteresis when changing from an "air" determination to an "object" determination and vice versa, to provide a transition region between a lower threshold and an upper threshold. For example, a lower threshold on the order of 2.5 may be applied to the "air" determination and an upper threshold on the order of 7.5 may be applied to the "object" determination for the block standard deviation data shown in FIG. 4G.

Alternatively, or additionally, other methods of air/object determination may be based, at least in part, on statistical modeling. Such statistical modeling may involve alternative methods of characterizing distributions of standard deviation values or other metrics related to statistical variance. Some such methods may, for example, involve an "air" determination based on a cluster or a small range of relatively small variance values and/or an "object" determination based on a broader distribution of relatively larger variance values. Some such methods may, for example, involve building statistical models of standard deviation values and/or other metrics related to statistical variance for "air" and for "object". The determination may be "air" if the standard deviation value or other metrics related to statistical variance matches the "air" model better than the "object" model. The determination may be "object" or "non-air" if the standard deviation value or other metrics related to statistical variance matches the object model better than the air model.

In some implementations, an "air" or "object" region may be determined by dividing some or all of the fingerprint image information into a plurality of blocks. Blocks having a pattern or feature may be identified, such as blocks having a ridge pattern, an edge, a feature gradient, or higher contrast. Blocks without a ridge pattern or other feature may be identified, such as blocks with lower gradients, lower signal or lower contrast (e.g., air). A predetermined or dynamic threshold level for a quantity such as gradient, signal or contrast may be established, and blocks below the threshold may be identified as part of an air region, while the remaining blocks may be identified as part of an object region. If a sufficient number of blocks are non-air, an object on or near the sensor may be ascertained and an object output signal may be generated. In some implementations, the air region may be eroded to determine a map or outline of the object region. Further eroding of the air region (e.g. by elimination of air blocks that are located further from the object region and/or by generating additional blocks near the periphery of the object with a different size, shape or position and identifying the additional blocks as air or object) may allow determination of the presence of a stylus or other object on the surface of a sensor. A stylus/non-stylus output signal may be generated to indicate if a stylus has been ascertained. In some implementations, the outline of the object region may be used to establish sensor data that lies in a fingerprint region, and the values of the sensor data in the fingerprint region may be scaled (e.g., adjust gain and offset) to further increase contrast and/or brightness.

Figure 4H:
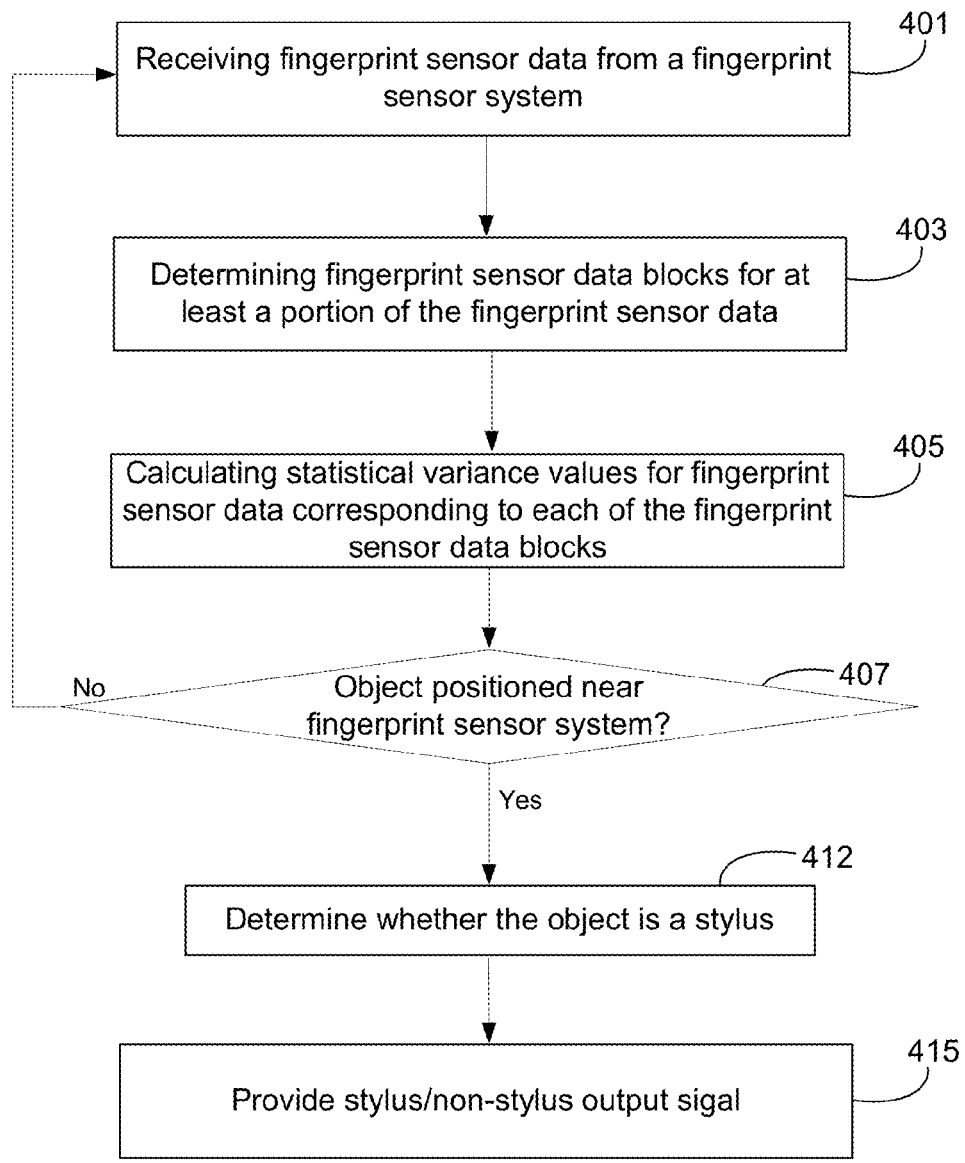
FIG. 4H is a flow diagram that provides additional examples of object detection operations.

FIG. 4H is a flow diagram that provides additional examples of object detection operations. At least some blocks of FIG. 4H may be performed by the control system 104 of FIG. 1A or by a similar apparatus. In some implementations, blocks 401-407 may be substantially as described above with reference to FIGS. 4A-4G.

However, in this example, if it is determined in block 407 that an object is positioned near the fingerprint sensor system, the process continues to block 412. Here, block 412 involves determining whether the object is a stylus. For example, the control system may determine whether the object is a stylus by evaluating the fingerprint sensor data to determine the object's size, the object's texture, the object's shape, the object's acoustic impedance level, and/or other factors. The control system also may be capable of providing an output signal indicating whether the object is a stylus, as shown in block 415.

In some examples, components of a sensor system (which may or may not include the fingerprint sensor system, depending on the particular implementation) may be capable of detecting when a stylus is in contact with a surface of a display device, such as a cover glass. The sensor system may be capable of tracking the motion of the stylus. Position data corresponding to the stylus tip may be used, for example, to obtain the signature of a user and/or to receive stylus input for purposes such as text input or menu selections.

Figure 4I:
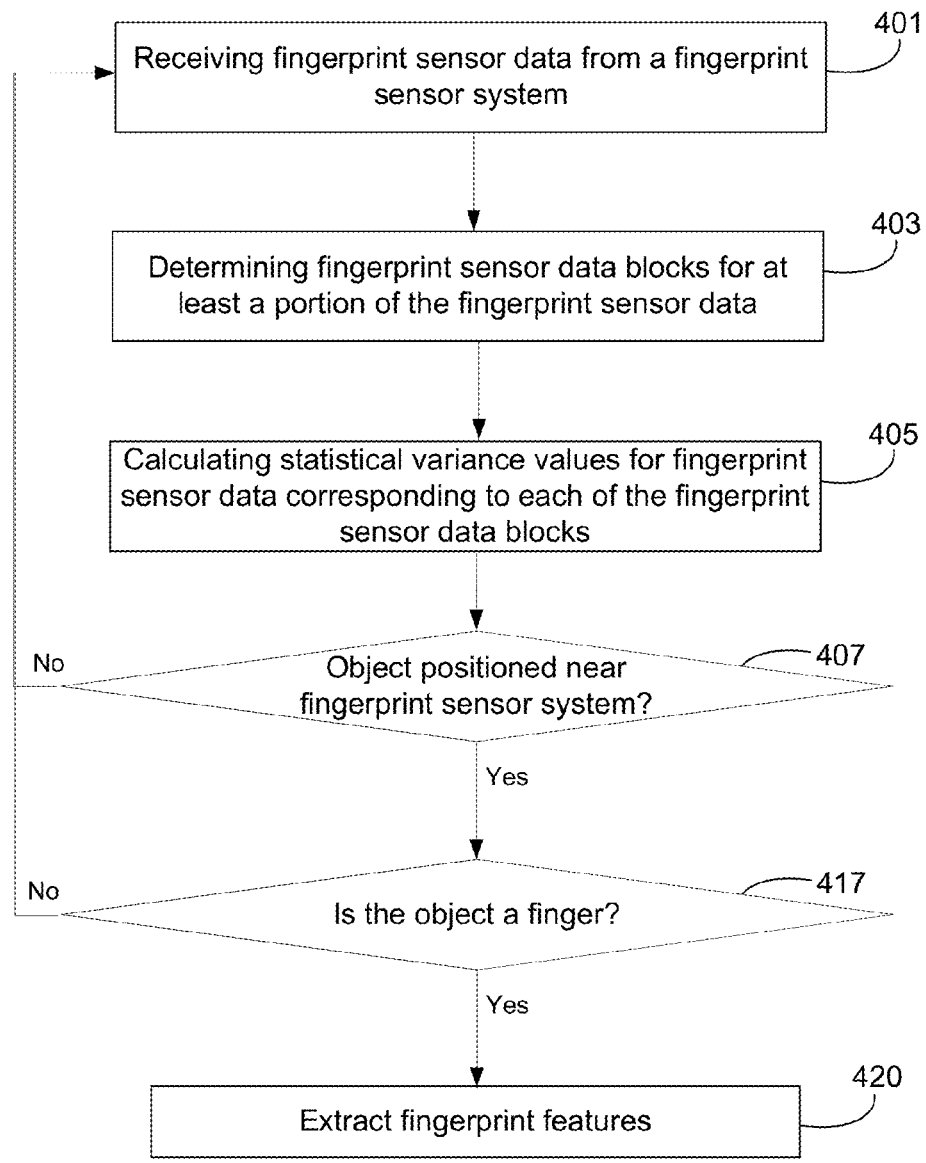
FIG. 4I is a flow diagram that provides additional examples of object detection operations.

FIG. 4I is a flow diagram that provides additional examples of object detection operations. At least some blocks of FIG. 4I may be performed by the control system 104 of FIG. 1A or by a similar apparatus. In some implementations, blocks 401-407 may be substantially as described above with reference to FIGS. 4A-4G.

However, in this example, if it is determined in block 407 that an object is positioned near the fingerprint sensor system, the process continues to block 417, wherein it is determined whether the object is a finger.

In some implementations wherein the fingerprint sensor system includes an ultrasonic sensor array, a control system may be capable of assessing the acoustic impedance (or a representation thereof) of one or more objects proximate the fingerprint sensor system. Determining whether an object is a finger may involve determining whether an object has an acoustic impedance that is within an acoustic impedance range corresponding to that of skin (e.g., between 1.3 MRayls and 2.1 MRayls).

In some examples, determining whether the object is a finger may involve determining whether the fingerprint sensor data indicates periodic or quasi-periodic elements that are within a range of spatial frequencies. The range of spatial frequencies may correspond with fingerprint features. Accordingly, in some implementations a control system may be capable of distinguishing a finger from another body part. Additional examples are provided below.

In this example, if it is determined that the object is a finger, fingerprint features are extracted in block 420. Some implementations also may involve further processing, such as fingerprint template generation, template matching, etc., as described elsewhere herein. Some implementations may involve one or more quality determinations, such as an image quality determination, a feature quality determination, etc., as described above.

Figure 5:
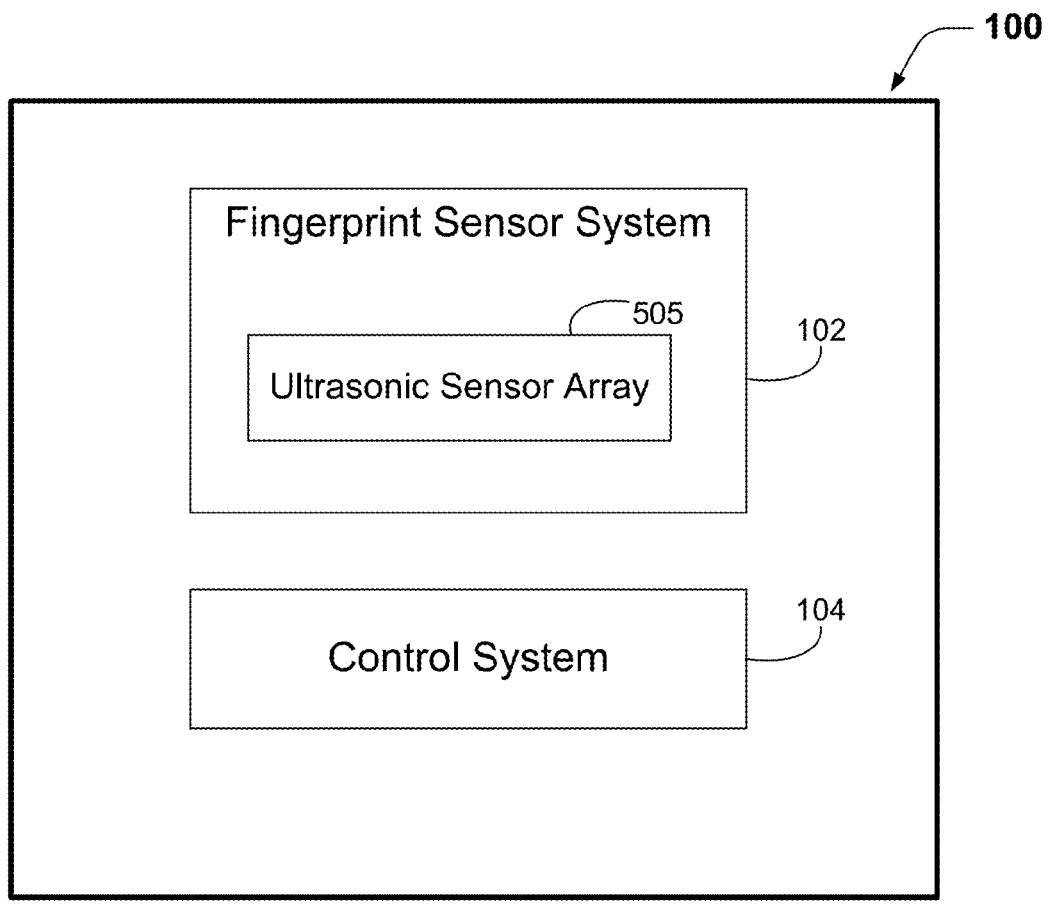
FIG. 5 is a block diagram that shows example components of a fingerprint sensing apparatus.

FIG. 5 is a block diagram that shows example components of a fingerprint sensing apparatus. In this example, the fingerprint sensing apparatus 100 includes a fingerprint sensor system 102 and a control system 104. The fingerprint sensor system 102 may include one or more arrays of fingerprint sensor pixels. In some examples, the fingerprint sensor system 102 may include one or more other types of fingerprint sensors, such as optical sensors, capacitive sensors, etc.

In this implementation, the fingerprint sensor system 102 includes at least one ultrasonic sensor array 505. In some implementations, components of the ultrasonic sensor array 505 may be similar to components of one of the touch/fingerprint sensing systems 10 that are described below with reference to FIGS. 8A-9B. However, in alternative implementations, the ultrasonic sensor array 505 may be configured differently. For example, the fingerprint sensor system 102 may or may not be part of a touch sensor system, depending on the particular implementation.

The control system 104 may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof. The control system 104 also may include (and/or be configured for communication with) one or more memory devices, such as one or more random access memory (RAM) devices, read-only memory (ROM) devices, etc. The control system 104 may be capable of receiving and processing fingerprint sensor data from the fingerprint sensor system.

Figure 6A:
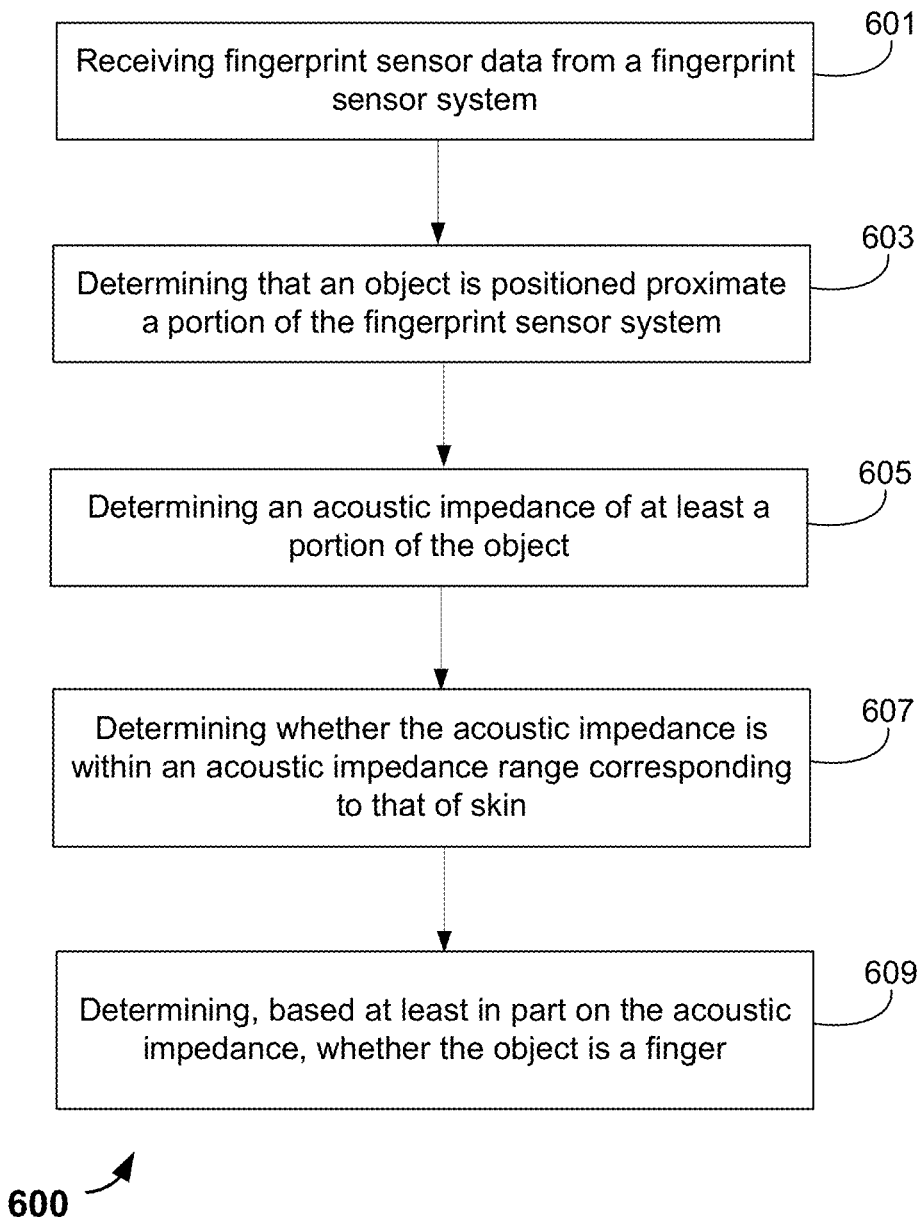
FIG. 6A is a flow diagram that shows example blocks of a method for determining whether an object is a finger.

FIG. 6A is a flow diagram that shows example blocks of a method for determining whether an object is a finger. The blocks of FIG. 6A (and those of other flow diagrams provided herein) may, for example, be performed by the control system 104 of FIG. 5 or by a similar apparatus. As with other methods disclosed herein, the method outlined in FIG. 6A may include more or fewer blocks than indicated. As noted above, the blocks of methods disclosed herein are not necessarily performed in the order indicated.

Here, block 601 involves receiving fingerprint sensor data from a fingerprint sensor system. The fingerprint sensor system may, for example, be the fingerprint sensor system 102 shown in FIG. 5 or a similar apparatus. Accordingly, the blocks of FIGS. 6A and 6C may be described with reference to the control system 104 and/or the fingerprint sensor system 102 of FIG. 5.

In this implementation, block 603 involves determining that an object is positioned proximate a portion of the fingerprint sensor system. Block 603 may, in some examples, correspond with blocks 403-407 of FIG. 4A and/or with blocks 402-407 of FIG. 4E.

In this example, block 605 involves determining an acoustic impedance of at least a portion of the object. For example, the fingerprint sensor data received in block 601 may include, or may be received with, ultrasonic sensor data from an ultrasonic sensor array such as that shown in FIG. 5. The control system 104 of FIG. 5 may be capable of determining the acoustic impedance according to the ultrasonic sensor data. As noted elsewhere herein, a value of acoustic impedance may be in non-standard units such as millivolts or a binary number between, for example, 0 and 255 (8 bits), which may serve as a representation of the acoustic impedance in standard units such as MRayls for determining whether an acoustic impedance is within a predetermined range.

Here, block 607 involves determining whether the acoustic impedance is within an acoustic impedance range corresponding to that of skin. In this example, block 609 involves determining, based at least in part on the acoustic impedance, whether the object is a finger.

FIG. 6B is a table that provides examples of acoustic impedance values for some common substances. In FIG. 6B, c represents the longitudinal wave velocity (speed of sound) for each corresponding substance. The acoustic impedance values, represented by Z in FIG. 6B, are expressed in MRayls ($1E6$ $kg/m^2s$). As noted in FIG. 6B, acoustic impedance is the product of c and p, which represents the density of each substance.

As shown in FIG. 6B, the acoustic impedance of soft tissue, such as skin, is similar to the acoustic impedance of fat, water and blood. However, the acoustic impedance of soft tissue is markedly different from that of many other common materials, including bone and aluminum. The acoustic impedance of other metals is generally higher than that of aluminum. For example, the acoustic impedances of lead, copper, molybdenum and tungsten are 24.6, 44.6, 63.1 and 101 MRayls, respectively. The acoustic impedance of glass is in the range of 12-16 MRayls.

Accordingly, if an object positioned near a fingerprint sensor system has an acoustic impedance that is within an acoustic impedance range corresponding to that of skin, there is a reasonable likelihood that the object is a finger or another body part. In some implementations, the acoustic impedance range may be from about 1.3 MRayls to about 2.1 MRayls, depending in part on the toughness of the skin, the amount of adipose tissue or fat, the amount of muscle tissue, the prevalence of blood and other biological materials at or near the surface of the body, and to a certain extent on the operating frequency. Alternatively, the acoustic impedance range may be a slightly different range, e.g., from about 1.7 MRayls to about 2.1 MRayls.

Figure 6C:
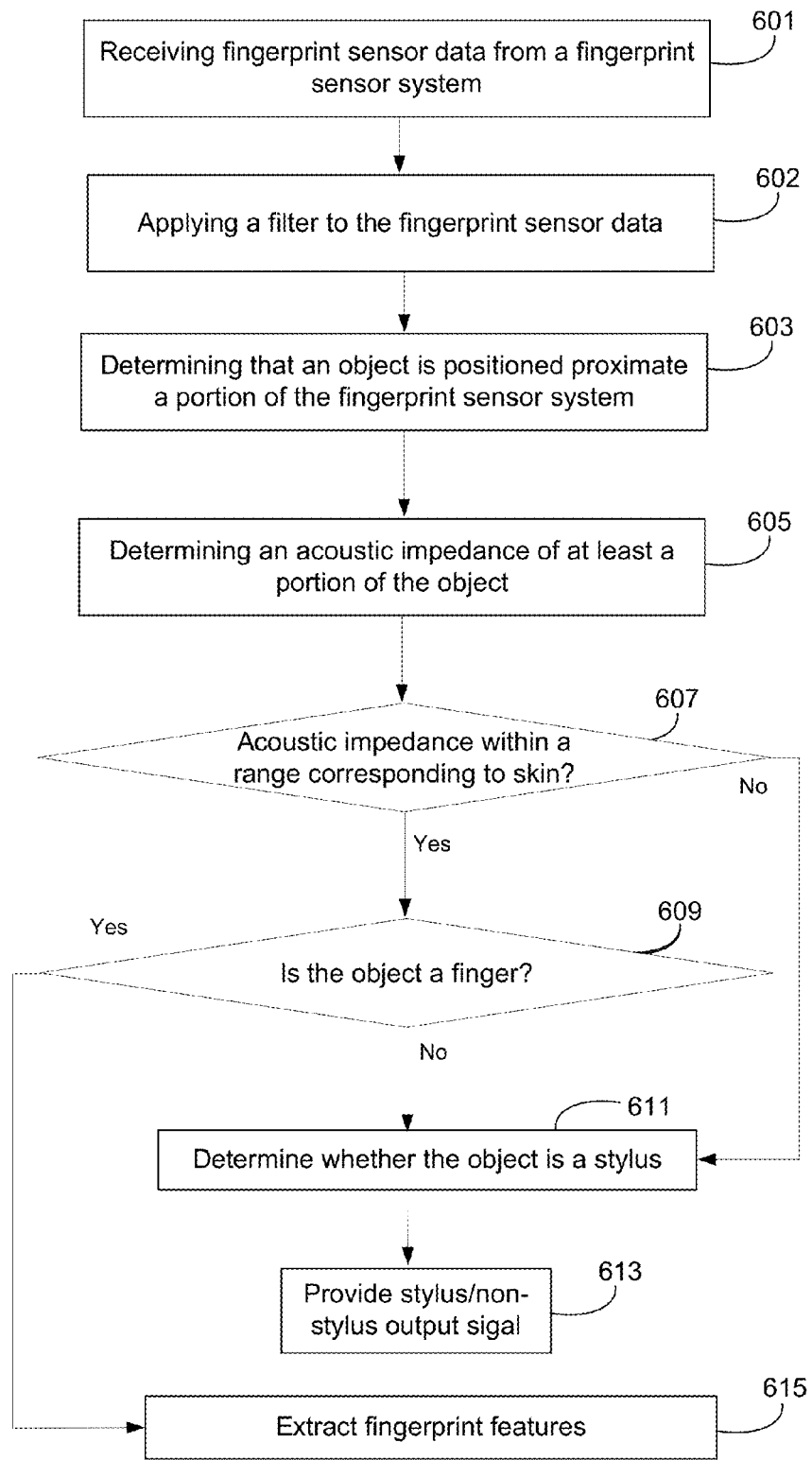
FIG. 6C is a flow diagram that shows example blocks of an alternative method.

FIG. 6C is a flow diagram that shows example blocks of an alternative method. The blocks of FIG. 6C (and those of other flow diagrams provided herein) may, for example, be performed by the control system 104 of FIG. 5 or by a similar apparatus. In some implementations, blocks 601-609 may be performed substantially as described above with reference to FIG. 6A.

In this example, if it is determined in block 607 that the acoustic impedance is not within a range corresponding to that of skin, the process continues to block 611. In this implementation, block 611 involves determining whether the object is a stylus. Block 611 may, for example, be performed substantially as described above with reference to block 117 of FIG. 1C. After determining in block 611 whether the object is a stylus, in this example an output signal is provided that indicates whether or not the object is a stylus (block 613).

However, if it is determined in block 607 that the acoustic impedance is within a range corresponding to that of skin, in this example the process continues to block 609. Here, block 609 involves determining whether the object is a finger.

As noted above, if an object positioned near a fingerprint sensor system has an acoustic impedance that is within an acoustic impedance range corresponding to that of skin, there is a reasonable likelihood that the object is a finger or another body part. Accordingly, in some implementations, block 609 may involve determining whether a skin-covered object is a finger or another body part. For example, in some such implementations, distinguishing a finger from another body part may involve distinguishing a nose, a cheek, a palm, an elbow, a knuckle or another part of the body from a finger. In some implementations, a control system may be capable of providing a body part output signal indicating whether a body part is positioned proximate a portion of the fingerprint sensor system. In some implementations, a control system may be capable of providing a low-level fraud output signal indicating whether an object positioned proximate a portion of the fingerprint sensor system is not a finger or a suitable body part when, for example, a fingerprint or other identifiable body feature is expected during enrollment, verification, or identification.

According to some such implementations, determining whether the object is a finger involves detecting patterns associated with fingerprints. Some examples are described below with reference to FIGS. 7A-7C.

If it is determined in block 609 that the object is a finger, in this example fingerprint features are extracted in block 615. Block 615 may be substantially similar to block 113 of FIGS. 1D-1F. In some implementations, fingerprint features may be extracted only if it is determined that the fingerprint sensor data includes fingerprint image information of at least an image quality threshold, e.g., as described above with reference to block 111 of FIGS. 1D-1F. Moreover, some implementations may involve further processing that involves the extracted fingerprint features, e.g., as described above with reference to FIGS. 1D-3.

Figures 7A, 7B, 7C:
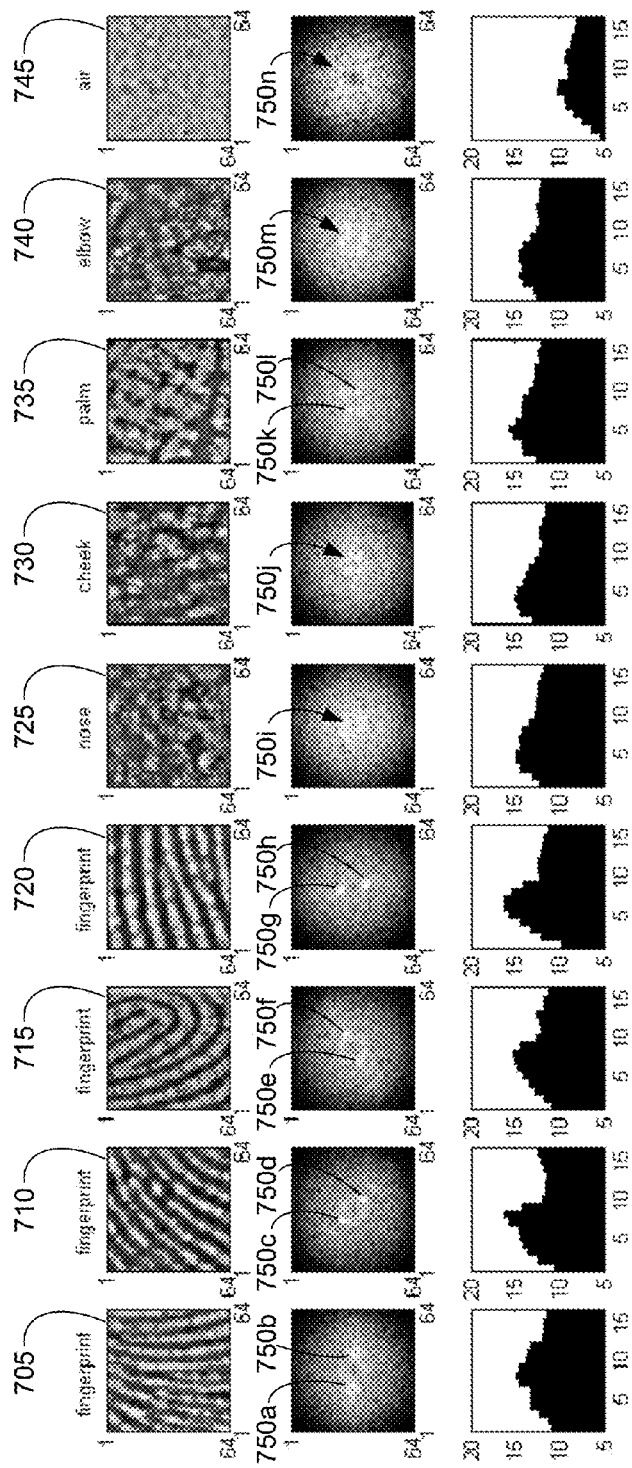
FIGS. 7A-7C provide examples of detecting patterns associated with fingerprints and other body parts by evaluating fingerprint sensor data blocks for at least a portion of received fingerprint sensor data.

FIGS. 7A-7C provide examples of detecting patterns associated with fingerprints and other body parts by evaluating fingerprint sensor data blocks for at least a portion of received fingerprint sensor data. FIG. 7A shows examples of images corresponding to fingerprint sensor data. Images 705-720 are fingerprint images, images 725-740 are images of portions of a nose, a cheek, a palm and an elbow, respectively, and image 745 is an image of air.

In this example, each of the images of FIG. 7A corresponds to a fingerprint sensor data block. Here, each fingerprint sensor data block corresponds to a block of fingerprint sensor pixels of a fingerprint sensor system. In this example, each image of FIG. 7A corresponds to a 64×64 block of fingerprint sensor pixels. Accordingly, the numbers along the x and y axes of each image correspond to fingerprint sensor pixels of each fingerprint sensor data block. In some implementations, the blocks of fingerprint sensor pixels used for the analysis may be contiguous. In some such implementations, the blocks may include all, or substantially all, fingerprint sensor pixels that correspond with an object. However, in alternative implementations, the blocks of fingerprint sensor pixels may be non-contiguous and may not include all, or substantially all, fingerprint sensor pixels that correspond with an object.

As shown in FIG. 7A, fingerprints may have oval-shaped edges as well as other structured patterns, such as ridges and valleys, whorls, bifurcations, etc. However, the images 725-740, which correspond to other body parts, lack some or all of these shapes and/or patterns. Therefore, in some implementations, the finger/non-finger determination of block 609 may involve an image-based analysis to detect shapes and/or patterns associated with fingerprints or other parts of the body.

Accordingly, determining whether the object is a finger may involve detecting a finger shape. Detecting a finger shape may involve detecting a three-dimensional shape, e.g., assessing the object's texture and/or topology. Therefore, some implementations may involve a texture analysis to determine whether the object includes fingerprint-like textures or structures. Such implementations may involve applying one or more feature detection algorithms, such as edge detection algorithms. Such assessments also may be useful in determining whether a non-finger object is a stylus, as most styli tend to be smooth and small with sharp boundaries.

Accordingly, some implementations may involve a local texture pattern analysis, a gradient-based pattern analysis, a wavelet-based analysis, a frequency domain analysis, or combinations thereof. Some implementations may involve applying one or more filters to the fingerprint sensor data before detecting patterns associated with fingerprints. In some implementations, the one or more filters may pass a range of spatial frequencies corresponding to patterns associated with fingerprints. The one or more filters may include a band-pass filter, a low-pass filter, a median filter, a de-noise filter, a Gaussian filter, a wavelet filter and/or a running-average filter.

The ridges and valleys of fingerprints, though all are different, tend to be within a predictable range of spatial frequencies. Accordingly, in some implementations, the finger/non-finger determination may involve determining whether an object includes a pattern having periodic or quasi-periodic elements. The finger/non-finger determination of block 609 may involve detecting periodic or quasi-periodic elements within this range of spatial frequencies in the fingerprint sensor data. In some implementations, the finger/non-finger determination of block 609 may involve detecting a distribution of the orientations of periodic or quasi-periodic elements within this range of spatial frequencies.

Some implementations may involve transforming data into the spatial frequency domain for analysis. Ridge-valley-type patterns can produce a pair of peaks or rings in the frequency domain. For images broken into an array 64×64 pixel blocks, such as the images shown in FIG. 7A, the ridge distance of fingerprint images at 500 dots per inch (dpi) is roughly 6 to 8 pixels, which can lead to a specific range of peaks/rings for fingerprints in the frequency domain. This is a further example of a range of spatial frequencies for a finger/non-finger determination.

FIG. 7B shows examples of transforming the corresponding images of FIG. 7A into the frequency domain. The frequency domain representation of each of the fingerprint images includes a characteristic type of peaks or rings. As shown in FIG. 7B, the presence or absence of such features can determine whether a human body part for which an image has been obtained corresponds to a fingerprint, a nose print, an elbow print, etc. The higher-energy (higher-intensity) areas of FIG. 7B are represented as lighter areas, whereas the lower-energy areas are darker. FIG. 7C is a series of bar graphs that show examples of energy (intensity) distributions on a log scale for each of the frequency domain transforms of FIG. 7B, with the x-axis in pixel units in the frequency domain.

The frequency domain representations of FIG. 7B that correspond to fingerprint images share similar characteristics. For example, the frequency domain representations corresponding to images 705-720 all include a pair of light, high-energy areas. Referring to FIG. 7C, the energy distributions for each of the frequency domain transforms that correspond to fingerprint images reach a peak at radius values of approximately 6-8 units.

However, there are some differences within these frequency domain representations of fingerprint images. The frequency domain representations corresponding to images 705 and 720, which include fingerprint ridges and valleys having relatively little curvature, include a pair of high-energy areas ((750a, 750b) and (750g, 750h)) that are more localized and relatively more circular in shape. In contrast, the frequency domain representations corresponding to images 710 and 715, which represent arcuate fingerprint ridges and valleys having relatively more curvature, include pairs of high-energy areas ((750c, 750d) and (750e, 750f)) that are "smeared" or distributed within a range of radii. It may be observed that predominantly vertical ridges and valleys as in fingerprint image 705 result in a pair of high-energy areas 750a, 750b that are predominantly horizontal (e.g. the direction of highest gradient), whereas the predominantly horizontal ridges and valleys as in fingerprint image 720 result in a pair of high-energy areas 750g, 750h that are predominantly vertical. The particular orientation of the high-energy areas can provide an indication of the direction of ridge flow within a portion of a fingerprint image.

The frequency domain representations corresponding to images 725, 730 and 740, which are nose, cheek and elbow images, respectively, do not include a pair of light, high-energy areas. Instead, the high-energy areas 750i, 750j and 750m are distributed more uniformly. The corresponding graphs of FIG. 7C show relatively "flatter" energy distributions over the same range of radii, as compared to the graphs corresponding to fingerprint images.

The frequency domain representation corresponding to image 735, which is a palm image, does show a pair of light, high-energy areas (750k, 750l). Accordingly, palm images may be relatively more difficult to differentiate from fingerprint images than images of other body parts. In this example, the pair of light, high-energy areas (750k, 750l) is even more localized than the pairs of high-energy areas ((750a, 750b) and (750g, 750h)) that may correspond to fingerprint images. The corresponding energy distribution graph in FIG. 7C reaches a peak at a radius value of about 5 units (smaller spatial frequency corresponding to larger distances between pronounced features), as compared to the peaks in the range of 6-8 units for the fingerprint images (larger spatial frequency corresponding to smaller distances between pronounced features). While frequency domain representations of air (e.g., 750n) may show some features due in part to row, column or pixel variations within the sensor, the intensity of the distributions may be appreciably reduced compared to images of fingers or other body parts.

If a sufficient number of blocks are analyzed, relatively more "smeared" pairs of high-energy areas, corresponding to arcuate fingerprint ridges and valleys should be detected if the images are actually fingerprint images. Therefore, by assessing a sufficient number of blocks, differences between a palm image and a fingerprint image should become apparent.

Figure 8A:
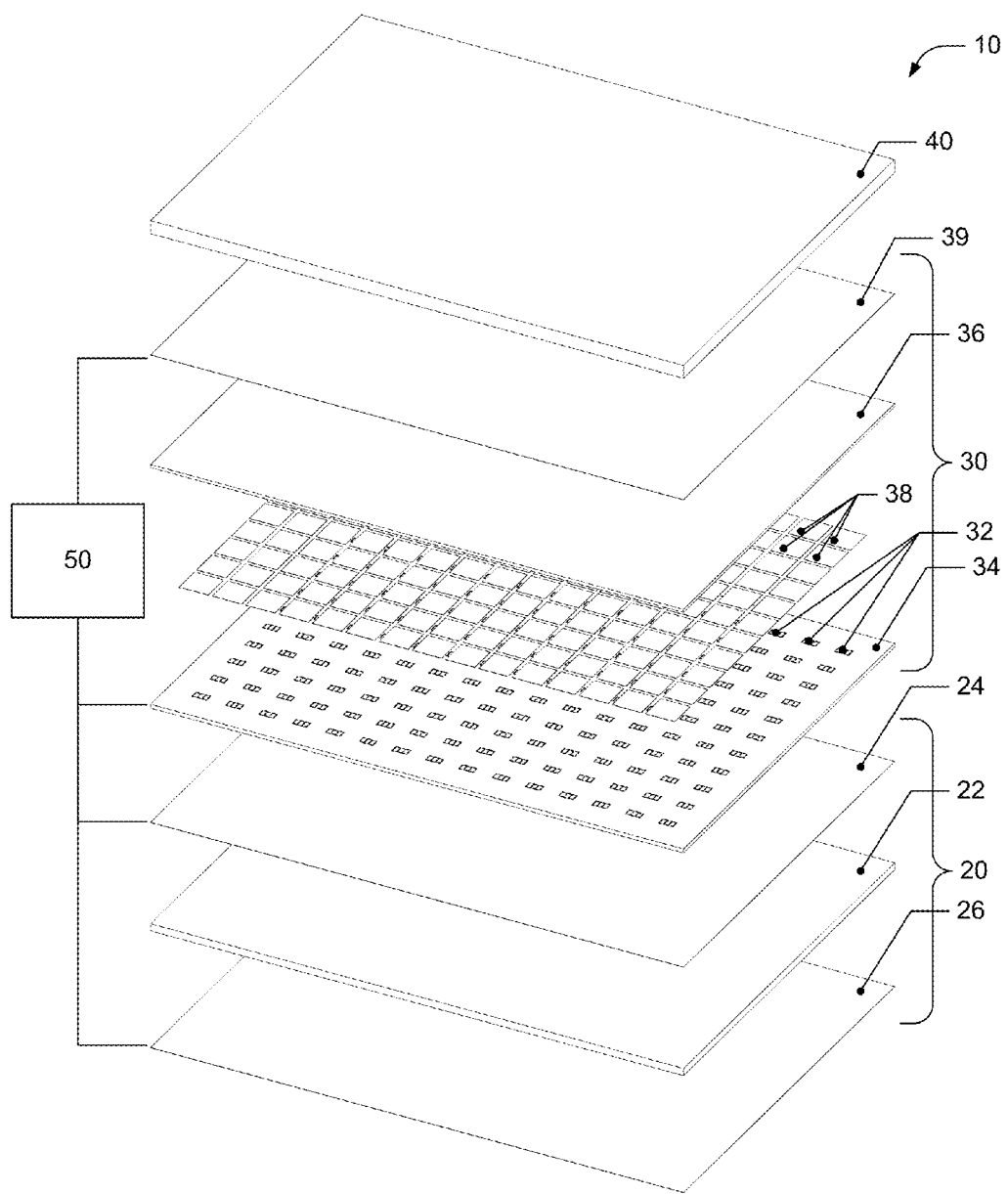
FIG. 8A shows an example of an exploded view of a touch/fingerprint sensing system.

FIG. 8A shows an example of an exploded view of a touch/fingerprint sensing system. In this example, the touch/fingerprint sensing system 10 includes an ultrasonic transmitter 20 and an ultrasonic receiver 30 under a platen 40. The ultrasonic transmitter 20 may include a substantially planar piezoelectric transmitter layer 22 and may be capable of functioning as a plane wave generator. Ultrasonic waves may be generated by applying a voltage to the piezoelectric layer to expand or contract the layer, depending upon the signal applied, thereby generating a plane wave. In this example, the control system 50 may be capable of causing a voltage that may be applied to the piezoelectric transmitter layer 22 via a first transmitter electrode 24 and a second transmitter electrode 26. In this fashion, an ultrasonic wave may be made by changing the thickness of the layer via a piezoelectric effect. This ultrasonic wave may travel towards a finger (or other object to be detected), passing through the platen 40. A portion of the wave not absorbed or transmitted by the object to be detected may be reflected so as to pass back through the platen 40 and be received by the ultrasonic receiver 30. The first and second transmitter electrodes 24 and 26 may be metallized electrodes, for example, metal layers that coat opposing sides of the piezoelectric transmitter layer 22.

The ultrasonic receiver 30 may include an array of sensor pixel circuits 32 disposed on a substrate 34, which also may be referred to as a backplane, and a piezoelectric receiver layer 36. In some implementations, each sensor pixel circuit 32 may include one or more TFT elements, electrical interconnect traces and, in some implementations, one or more additional circuit elements such as diodes, capacitors, and the like. Each sensor pixel circuit 32 may be configured to convert an electric charge generated in the piezoelectric receiver layer 36 proximate to the pixel circuit into an electrical signal. Each sensor pixel circuit 32 may include a pixel input electrode 38 that electrically couples the piezoelectric receiver layer 36 to the sensor pixel circuit 32.

In the illustrated implementation, a receiver bias electrode 39 is disposed on a side of the piezoelectric receiver layer 36 proximal to platen 40. The receiver bias electrode 39 may be a metallized electrode and may be grounded or biased to control which signals may be passed to the array of sensor pixel circuits 32. Ultrasonic energy that is reflected from the exposed (top) surface 42 of the platen 40 may be converted into localized electrical charges by the piezoelectric receiver layer 36. These localized charges may be collected by the pixel input electrodes 38 and passed on to the underlying sensor pixel circuits 32. The charges may be amplified by the sensor pixel circuits 32 and provided to the control system 50.

The control system 50 may be electrically connected (directly or indirectly) with the first transmitter electrode 24 and the second transmitter electrode 26, as well as with the receiver bias electrode 39 and the sensor pixel circuits 32 on the substrate 34. In some implementations, the control system 50 may operate substantially as described above. For example, the control system 50 may be capable of processing the amplified signals received from the sensor pixel circuits 32.

The control system 50 may be capable of controlling the ultrasonic transmitter 20 and/or the ultrasonic receiver 30 to obtain fingerprint image information, e.g., by obtaining fingerprint images. Whether or not the touch/fingerprint sensing system 10 includes an ultrasonic transmitter 20, the control system 50 may be capable of controlling access to one or more devices based, at least in part, on the fingerprint image information. The touch/fingerprint sensing system 10 (or an associated device) may include a memory system that includes one or more memory devices. In some implementations, the control system 50 may include at least a portion of the memory system. The control system 50 may be capable of capturing a fingerprint image and storing fingerprint image information in the memory system. In some implementations, the control system 50 may be capable of capturing a fingerprint image and storing fingerprint image information in the memory system even while maintaining the ultrasonic transmitter 20 in an "off" state.

In some implementations, the control system 50 may be capable of operating the touch/fingerprint sensing system in an ultrasonic imaging mode or a force-sensing mode. In some implementations, the control system may be capable of maintaining the ultrasonic transmitter 20 in an "off" state when operating the touch/fingerprint sensing system in a force-sensing mode. The ultrasonic receiver 30 may be capable of functioning as a force sensor when the touch/fingerprint sensing system 10 is operating in the force-sensing mode.

In some implementations, the control system 50 may be capable of controlling other devices, such as a display system, a communication system, etc. In some implementations, for example, the control system 50 may be capable of powering on one or more components of a device such as the display device 940, which is described below with reference to FIGS. 9A and 9B. Accordingly, in some implementations the control system 50 also may include one or more components similar to the processor 921, the array driver 922 and/or the driver controller 929 shown in FIG. 9B. In some implementations, the control system 50 may be capable of detecting a touch or tap received via the ultrasonic receiver 30 serving as a force-sensing device and activating at least one feature of the mobile display device in response to the touch or tap. The "feature" may be a component, a software application, etc.

The platen 40 can be any appropriate material that can be acoustically coupled to the receiver, with examples including plastic, ceramic, sapphire, metal and glass. In some implementations, the platen 40 can be a cover plate, e.g., a cover glass or a lens glass for a display. Particularly when the ultrasonic transmitter 20 is in use, fingerprint detection and imaging can be performed through relatively thick platens if desired, e.g., 3 mm and above. However, for implementations in which the ultrasonic receiver 30 is capable of imaging fingerprints in a force detection mode, a thinner and relatively more compliant platen 40 may be desirable. According to some such implementations, the platen 40 may include one or more polymers, such as one or more types of parylene, and may be substantially thinner. In some such implementations, the platen 40 may be tens of microns thick or even less than 10 microns thick.

Examples of piezoelectric materials that may be used to form the piezoelectric receiver layer 36 include piezoelectric polymers having appropriate acoustic properties, for example, an acoustic impedance between about 2.5 MRayls and 5 MRayls. Specific examples of piezoelectric materials that may be employed include ferroelectric polymers such as polyvinylidene fluoride (PVDF) and polyvinylidene fluoride-trifluoroethylene (PVDF-TrFE) copolymers. Examples of PVDF copolymers include 60:40 (molar percent) PVDF-TrFE, 70:30 PVDF-TrFE, 80:20 PVDF-TrFE, and 90:10 PVDR-TrFE. Other examples of piezoelectric materials that may be employed include polyvinylidene chloride (PVDC) homopolymers and copolymers, polytetrafluoroethylene (PTFE) homopolymers and copolymers, and diisopropylammonium bromide (DIPAB).

The thickness of each of the piezoelectric transmitter layer 22 and the piezoelectric receiver layer 36 may be selected so as to be suitable for generating and receiving ultrasonic waves. In one example, a PVDF piezoelectric transmitter layer 22 is approximately 28 µm thick and a PVDF-TrFE receiver layer 36 is approximately 12 µm thick. Example frequencies of the ultrasonic waves may be in the range of 5 MHz to 30 MHz, with wavelengths on the order of a millimeter or less.

Figure 8B:
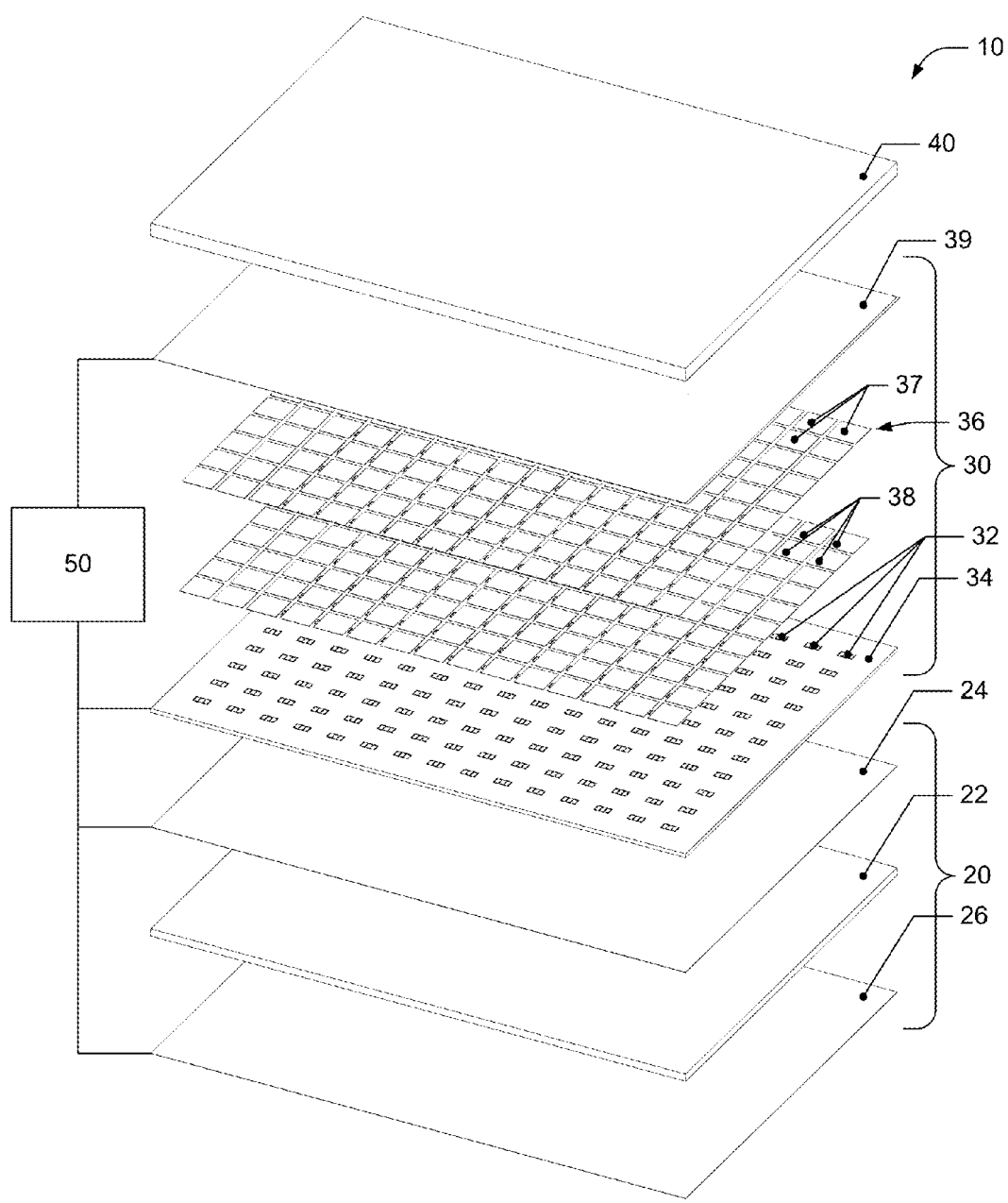
FIG. 8B shows an exploded view of an alternative example of a touch/fingerprint sensing system.

FIG. 8B shows an exploded view of an alternative example of a touch/fingerprint sensing system. In this example, the piezoelectric receiver layer 36 has been formed into discrete elements 37. In the implementation shown in FIG. 8B, each of the discrete elements 37 corresponds with a single pixel input electrode 38 and a single sensor pixel circuit 32. However, in alternative implementations of the touch/fingerprint sensing system 10, there is not necessarily a one-to-one correspondence between each of the discrete elements 37, a single pixel input electrode 38 and a single sensor pixel circuit 32. For example, in some implementations there may be multiple pixel input electrodes 38 and sensor pixel circuits 32 for a single discrete element 37.

FIGS. 8A and 8B show example arrangements of ultrasonic transmitters and receivers in a touch/fingerprint sensing system, with other arrangements possible. For example, in some implementations, the ultrasonic transmitter 20 may be above the ultrasonic receiver 30 and therefore closer to the object(s) 25 to be detected. In some implementations, the touch/fingerprint sensing system 10 may include an acoustic delay layer. For example, an acoustic delay layer can be incorporated into the touch/fingerprint sensing system 10 between the ultrasonic transmitter 20 and the ultrasonic receiver 30. An acoustic delay layer can be employed to adjust the ultrasonic pulse timing, and at the same time electrically insulate the ultrasonic receiver 30 from the ultrasonic transmitter 20. The acoustic delay layer may have a substantially uniform thickness, with the material used for the delay layer and/or the thickness of the delay layer selected to provide a desired delay in the time for reflected ultrasonic energy to reach the ultrasonic receiver 30. In doing so, the range of time during which an energy pulse that carries information about the object by virtue of having been reflected by the object may be made to arrive at the ultrasonic receiver 30 during a time range when it is unlikely that energy reflected from other parts of the touch/fingerprint sensing system 10 is arriving at the ultrasonic receiver 30. In some implementations, the substrate 34 and/or the platen 40 may serve as an acoustic delay layer.

Figure 9A:
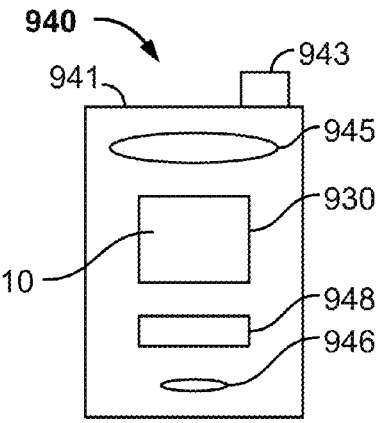
FIGS. 9A and 9B show examples of system block diagrams illustrating a display device that includes a touch/fingerprint sensing system as described herein.
Figure 9B:
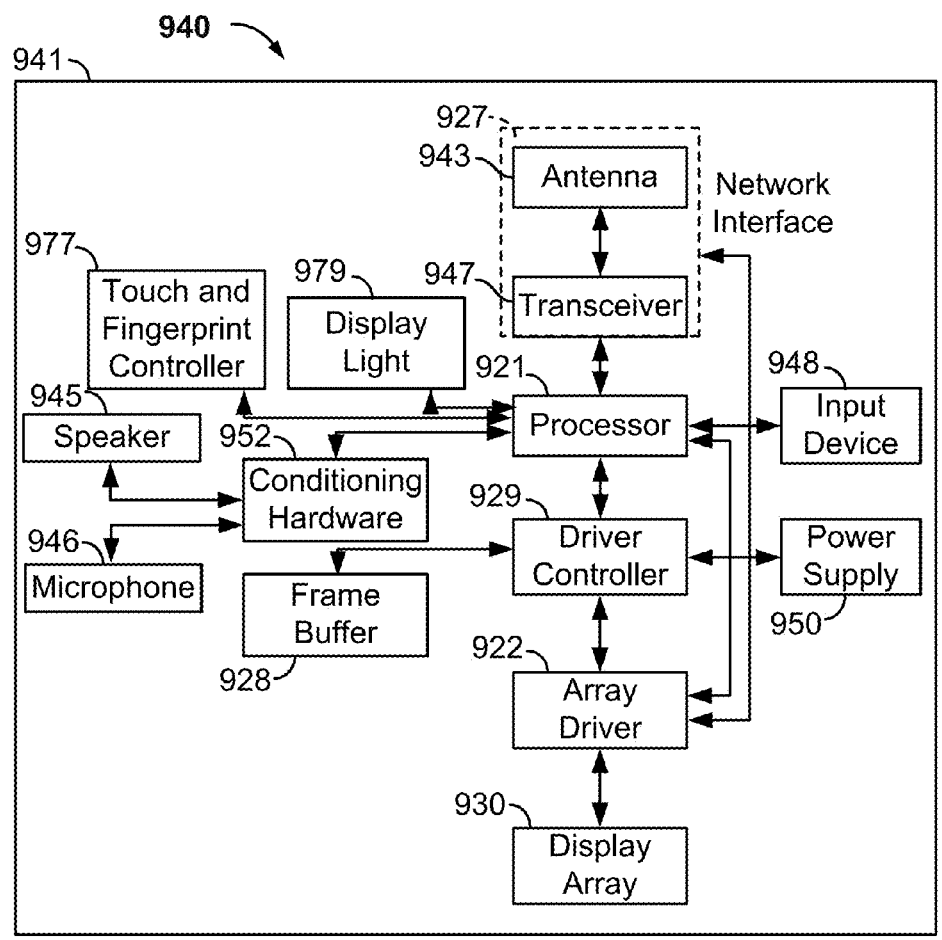

FIGS. 9A and 9B show examples of system block diagrams illustrating a display device that includes a touch/fingerprint sensing system as described herein. The display device 940 may be, for example, mobile display device such as a smart phone, a cellular or mobile telephone, etc. However, the same components of the display device 940 or slight variations thereof are also illustrative of various types of display devices such as televisions, computers, tablets, e-readers, hand-held devices and portable media devices.

In this example, the display device 940 includes a housing 941, a display 930, a touch/fingerprint sensing system 10 (which may part of or separated from the visual display 930), an antenna 943, a speaker 945, an input device 948 and a microphone 946. The housing 941 may be formed from any of a variety of manufacturing processes, including injection molding, and vacuum forming. In addition, the housing 941 may be made from any of a variety of materials, including, but not limited to: plastic, metal, glass, rubber and ceramic, or a combination thereof. The housing 941 may include removable portions (not shown) that may be interchanged with other removable portions of different color, or containing different logos, pictures, or symbols.

The display 930 may be any of a variety of displays, including a flat-panel display, such as plasma, organic light-emitting diode (OLED) or liquid crystal display (LCD), or a non-flat-panel display, such as a cathode ray tube (CRT) or other tube device. In addition, the display 930 may include an interferometric modulator (IMOD)-based display or a micro-shutter based display.

The components of one example of the display device 940 are schematically illustrated in FIG. 9B. Here, the display device 940 includes a housing 941 and may include additional components at least partially enclosed therein. For example, the display device 940 includes a network interface 927 that includes an antenna 943 which may be coupled to a transceiver 947. The network interface 927 may be a source for image data that could be displayed on the display device 940. Accordingly, the network interface 927 is one example of an image source module, but the processor 921 and the input device 948 also may serve as an image source module. The transceiver 947 is connected to a processor 921, which is connected to conditioning hardware 952. The conditioning hardware 952 may be capable of conditioning a signal (such as applying a filter or otherwise manipulating a signal). The conditioning hardware 952 may be connected to a speaker 945 and a microphone 946. The processor 921 also may be connected to an input device 948 and a driver controller 929. The driver controller 929 may be coupled to a frame buffer 928, and to an array driver 922, which in turn may be coupled to a display array 930. One or more elements in the display device 940, including elements not specifically depicted in FIG. 9B, may be capable of functioning as a memory device and be capable of communicating with the processor 921 or other components of a control system. In some implementations, a power supply 950 may provide power to substantially all components in the particular display device 940 design.

In this example, the display device 940 also includes a touch and fingerprint controller 977. The touch and fingerprint controller 977 may, for example, be a part of a control system 50 or a control system 104 such as that described above. Accordingly, in some implementations the touch and fingerprint controller 977 (and/or other components of the control system 50) may include one or more memory devices. In some implementations, the control system 50 also may include components such as the processor 921, the array driver 922 and/or the driver controller 929 shown in FIG. 9B. The touch and fingerprint controller 977 may be capable of communicating with the touch/fingerprint sensing system 10, e.g., via routing wires, and may be capable of controlling the touch/fingerprint sensing system 10. The touch and fingerprint controller 977 may be capable of determining a location and/or movement of one or more objects, such as fingers, on or proximate the touch/fingerprint sensing system 10. In alternative implementations, however, the processor 921 (or another part of the control system 50) may be capable of providing some or all of the functionality of the touch and fingerprint controller 977, the control system 50 and/or of the control system 104.

The touch and fingerprint controller 977 (and/or another element of the control system 50) may be capable of providing input for controlling the display device 940 according to one or more touch locations. In some implementations, the touch and fingerprint controller 977 may be capable of determining movements of one or more touch locations and of providing input for controlling the display device 940 according to the movements. Alternatively, or additionally, the touch and fingerprint controller 977 may be capable of determining locations and/or movements of objects that are proximate the display device 940. Accordingly, the touch and fingerprint controller 977 may be capable of detecting finger or stylus movements, hand gestures, etc., even if no contact is made with the display device 40. The touch and fingerprint controller 977 may be capable of providing input for controlling the display device 40 according to such detected movements and/or gestures.

As described elsewhere herein, the touch and fingerprint controller 977 (or another element of the control system 50) may be capable of providing one or more fingerprint detection operational modes. Accordingly, in some implementations the touch and fingerprint controller 977 (or another element of the control system 50) may be capable of producing fingerprint images. In some implementations, such as when an ultrasonic sensor array of the fingerprint sensor system is physically separated from the visual display 930, the controller for the fingerprint sensor system may be separate from and operate largely independent of the touch controller.

In some implementations, the touch/fingerprint sensing system 10 may include an ultrasonic receiver 30 and/or an ultrasonic transmitter 20 such as described elsewhere herein. According to some such implementations, the touch and fingerprint controller 977 (or another element of the control system 50) may be capable of receiving input from the ultrasonic receiver 30 and powering on or "waking up" the ultrasonic transmitter 20 and/or another component of the display device 940.

The network interface 927 includes the antenna 943 and the transceiver 947 so that the display device 940 may communicate with one or more devices over a network. The network interface 927 also may have some processing capabilities to relieve, for example, data processing requirements of the processor 921. The antenna 943 may transmit and receive signals. In some implementations, the antenna 943 transmits and receives RF signals according to the IEEE 16.11 standard, including IEEE 16.11(a), (b), or (g), or the IEEE 802.11 standard, including IEEE 802.11a, b, g, n, and further implementations thereof. In some other implementations, the antenna 943 transmits and receives RF signals according to the Bluetooth® standard. In the case of a cellular telephone, the antenna 943 may be designed to receive code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless network, such as a system utilizing 3G, 4G or 5G technology. The transceiver 947 may pre-process the signals received from the antenna 943 so that they may be received by and further manipulated by the processor 921. The transceiver 947 also may process signals received from the processor 921 so that they may be transmitted from the display device 940 via the antenna 943.

In some implementations, the transceiver 947 may be replaced by a receiver. In addition, in some implementations, the network interface 927 may be replaced by an image source, which may store or generate image data to be sent to the processor 921. The processor 921 may control the overall operation of the display device 940. The processor 921 receives data, such as compressed image data from the network interface 927 or an image source, and processes the data into raw image data or into a format that may be readily processed into raw image data. The processor 921 may send the processed data to the driver controller 929 or to the frame buffer 928 for storage. Raw data typically refers to the information that identifies the image characteristics at each location within an image. For example, such image characteristics may include color, saturation and gray-scale level.

The processor 921 may include a microcontroller, CPU, or logic unit to control operation of the display device 940. The conditioning hardware 952 may include amplifiers and filters for transmitting signals to the speaker 945, and for receiving signals from the microphone 946. The conditioning hardware 952 may be discrete components within the display device 940, or may be incorporated within the processor 921 or other components.

The driver controller 929 may take the raw image data generated by the processor 921 either directly from the processor 921 or from the frame buffer 928 and may re-format the raw image data appropriately for high speed transmission to the array driver 922. In some implementations, the driver controller 929 may re-format the raw image data into a data flow having a raster-like format, such that it has a time order suitable for scanning across the display array 930. Then the driver controller 929 sends the formatted information to the array driver 922. Although a driver controller 929, such as an LCD controller, is often associated with the system processor 921 as a stand-alone Integrated Circuit (IC), such controllers may be implemented in many ways. For example, controllers may be embedded in the processor 921 as hardware, embedded in the processor 921 as software, or fully integrated in hardware with the array driver 922.

The array driver 922 may receive the formatted information from the driver controller 929 and may re-format the video data into a parallel set of waveforms that are applied many times per second to the hundreds, and sometimes thousands (or more), of leads coming from the display's x-y matrix of display elements.

In some implementations, the driver controller 929, the array driver 922, and the display array 930 are appropriate for any of the types of displays described herein. For example, the driver controller 929 may be a conventional display controller or a bi-stable display controller (such as an IMOD display element controller). Additionally, the array driver 922 may be a conventional driver or a bi-stable display driver. Moreover, the display array 930 may be a conventional display array or a bi-stable display. In some implementations, the driver controller 929 may be integrated with the array driver 922. Such an implementation may be useful in highly integrated systems, for example, mobile phones, portable-electronic devices, watches or small-area displays.

In some implementations, the input device 948 may be capable of allowing, for example, a user to control the operation of the display device 940. The input device 948 may include a keypad, such as a QWERTY keyboard or a telephone keypad, a button, a switch, a rocker, a touch-sensitive screen, a touch-sensitive screen integrated with the display array 930, or a pressure- or heat-sensitive membrane. The microphone 946 may be capable of functioning as an input device for the display device 940. In some implementations, voice commands through the microphone 946 may be used for controlling operations of the display device 940.

The power supply 950 may include a variety of energy storage devices. For example, the power supply 950 may be a rechargeable battery, such as a nickel-cadmium battery or a lithium-ion battery. In implementations using a rechargeable battery, the rechargeable battery may be chargeable using power coming from, for example, a wall socket or a photovoltaic device or array. Alternatively, the rechargeable battery may be wirelessly chargeable. The power supply 950 also may be a renewable energy source, a capacitor, or a solar cell, including a plastic solar cell or solar-cell paint. The power supply 950 also may be capable of receiving power from a wall outlet.

In some implementations, control programmability resides in the driver controller 929 which may be located in several places in the electronic display system. In some other implementations, control programmability resides in the array driver 922. The above-described optimization may be implemented in any number of hardware and/or software components and in various configurations.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium, such as a non-transitory medium. The processes of a method or algorithm disclosed herein may be implemented in a processor-executable software module which may reside on a computer-readable medium. Computer-readable media include both computer storage media and communication media including any medium that may be enabled to transfer a computer program from one place to another. Storage media may be any available media that may be accessed by a computer. By way of example, and not limitation, non-transitory media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those having ordinary skill in the art, and the generic principles defined herein may be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein, if at all, to mean "serving as an example, instance, or illustration." Any implementation described herein as "exemplary" is not necessarily to be construed as preferred or advantageous over other implementations.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, other implementations are within the scope of the following claims. In some cases, the actions recited in the claims may be performed in a different order and still achieve desirable results.

It will be understood that unless features in any of the particular described implementations are expressly identified as incompatible with one another or the surrounding context implies that they are mutually exclusive and not readily combinable in a complementary and/or supportive sense, the totality of this disclosure contemplates and envisions that specific features of those complementary implementations may be selectively combined to provide one or more comprehensive, but slightly different, technical solutions. It will therefore be further appreciated that the above description has been given by way of example only and that modifications in detail may be made within the scope of this disclosure.

What is claimed is:

1. A fingerprint sensing apparatus, comprising:
   a fingerprint sensor system including an ultrasonic sensor array; and
   a control system capable of:
   receiving fingerprint sensor data from the fingerprint sensor system;
   determining that an object is positioned proximate a portion of the fingerprint sensor system;
   determining an acoustic impedance of at least a portion of the object;
   determining whether the acoustic impedance is within an acoustic impedance range corresponding to that of skin; and
   determining, based at least in part on the acoustic impedance, whether the object is a finger, wherein:
   determining whether the object is a finger involves detecting patterns associated with fingerprints;
   detecting patterns associated with fingerprints involves evaluating fingerprint sensor data blocks for at least a portion of the fingerprint sensor data; and
   the fingerprint sensor data blocks correspond to blocks of fingerprint sensor pixels of the fingerprint sensor system.

2. The apparatus of claim 1, wherein acoustic impedance range is between about 1.3 MRayls and 2.1 MRayls.

3. The apparatus of claim 1, wherein the control system is capable of distinguishing a finger from another body part.

4. The apparatus of claim 3, wherein distinguishing a finger from another body part involves distinguishing a nose, a cheek, a palm, an elbow, a knuckle or another part of the body from a finger.

5. The apparatus of claim 1, wherein detecting patterns associated with fingerprints involves one or more analyses selected from a list of analyses consisting of: a local texture pattern analysis, a gradient-based pattern analysis, a wavelet-based analysis, a frequency domain analysis and combinations thereof.

6. The apparatus of claim 1, wherein the control system is further capable of applying one or more filters to the fingerprint sensor data before detecting patterns associated with fingerprints.

7. The apparatus of claim 6, wherein the one or more filters pass a range of spatial frequencies corresponding to patterns associated with fingerprints.

8. The apparatus of claim 6, wherein the one or more filters include at least one filter selected from a group of filters consisting of: a band-pass filter, low-pass filter, a median filter, a de-noise filter, a Gaussian filter, a wavelet filter and a running-average filter.

9. The apparatus of claim 1, wherein the blocks of fingerprint sensor pixels are contiguous.

10. The apparatus of claim 1, wherein the blocks include substantially all fingerprint sensor pixels that correspond with the object.

11. The apparatus of claim 1, wherein the blocks of fingerprint sensor pixels are non-contiguous.

12. The apparatus of claim 1, wherein determining whether the object is a finger involves detecting a finger shape.

13. The apparatus of claim 12, wherein detecting a finger shape involves detecting a three-dimensional shape.

14. The apparatus of claim 1, wherein the control system is further capable of determining whether the object is a stylus.

15. The apparatus of claim 14, wherein the control system is capable of providing a stylus output signal indicating whether the object is a stylus.

16. The apparatus of claim 1, wherein the control system is further capable of extracting fingerprint features from the fingerprint sensor data if the control system determines that the object is a finger.

17. The apparatus of claim 1, wherein the control system includes one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof.

18. The apparatus of claim 1, wherein the control system is capable of pre-processing the fingerprint sensor data prior to determining whether the object is a finger.

19. The apparatus of claim 1, wherein the control system is capable of pre-processing the fingerprint sensor data prior to determining whether an object is positioned proximate a portion of the fingerprint sensor system.

20. The apparatus of claim 19, wherein the pre-processing involves at least one process selected from a group of processes consisting of filtering, gain compensation, offset adjustment, background subtraction, a de-noise operation, contrast enhancement, scaling, linearization and clipping.

21. The apparatus of claim 19, wherein the pre-processing involves:

identifying malfunctioning sensor pixels, the malfunctioning sensor pixels including at least one of dead sensor pixels or low-performing sensor pixels; and excluding fingerprint sensor data from the malfunctioning sensor pixels.

22. A method, comprising:

receiving fingerprint sensor data from a fingerprint sensor system;

determining that an object is positioned proximate a portion of the fingerprint sensor system;

determining an acoustic impedance of at least a portion of the object;

determining whether the acoustic impedance is within an acoustic impedance range corresponding to that of skin; and determining, based at least in part on the acoustic impedance, whether the object is a finger and whether the object is a stylus, and wherein:

determining whether the object is a finger involves detecting patterns associated with fingerprints;

detecting patterns associated with fingerprints involves evaluating fingerprint sensor data blocks for at least a portion of the fingerprint sensor data; and the fingerprint sensor data blocks correspond to blocks of fingerprint sensor pixels of the fingerprint sensor system.

23. A non-transitory medium having software stored thereon, the software including instructions for controlling a fingerprint sensing apparatus to:

receive fingerprint sensor data from a fingerprint sensor system;

pre-process the fingerprint sensor data, wherein pre-processing the fingerprint sensor data involves:

identifying malfunctioning sensor pixels, the malfunctioning sensor pixels including at least one of dead sensor pixels or low-performing sensor pixels; and excluding fingerprint sensor data from the malfunctioning sensor pixels;

determine that an object is positioned proximate a portion of the fingerprint sensor system;

determine an acoustic impedance of at least a portion of the object;

determine whether the acoustic impedance is within an acoustic impedance range corresponding to that of skin; and determine, based at least in part on the acoustic impedance, whether the object is a finger.

24. The non-transitory medium of claim 23, wherein determining whether the object is a finger involves detecting patterns associated with fingerprints.

25. The non-transitory medium of claim 23, wherein detecting patterns associated with fingerprints involves one or more analyses selected from a list of analyses consisting of a local texture pattern analysis, a gradient-based pattern analysis, a wavelet-based analysis, a frequency domain analysis, and combinations thereof.

26. The non-transitory medium of claim 23, wherein detecting patterns associated with fingerprints involves evaluating fingerprint sensor data blocks for at least a portion of the fingerprint sensor data, the fingerprint sensor data blocks corresponding to blocks of fingerprint sensor pixels of the fingerprint sensor system.

27. The non-transitory medium of claim 23, wherein the software includes instructions for controlling the fingerprint sensing apparatus to distinguish a finger from another body part.

28. A fingerprint sensing apparatus, comprising:

a fingerprint sensor system including an ultrasonic sensor array; and control means for:

receiving fingerprint sensor data from the fingerprint sensor system;

determining that an object is positioned proximate a portion of the fingerprint sensor system;

determining an acoustic impedance of at least a portion of the object;

determining whether the acoustic impedance is within an acoustic impedance range corresponding to that of skin; and determining, based at least in part on the acoustic impedance, whether the object is a finger, wherein:

determining whether the object is a finger involves detecting patterns associated with fingerprints;

detecting patterns associated with fingerprints involves evaluating fingerprint sensor data blocks for at least a portion of the fingerprint sensor data; and the fingerprint sensor data blocks correspond to blocks of fingerprint sensor pixels of the fingerprint sensor system.

29. The apparatus of claim 28, wherein the control means includes means for distinguishing a finger from another body part.

* * * * *